United States Patent
Brehmer et al.

(10) Patent No.: US 11,210,825 B1
(45) Date of Patent: Dec. 28, 2021

(54) GLYPH SCAFFOLDS FOR GENERATING UNIQUE GLYPHS TO USE AS DATA MARKS IN DATA VISUALIZATIONS

(71) Applicant: Tableau Software, LLC, Seattle, WA (US)

(72) Inventors: Matthew Michael Brehmer, Seattle, WA (US); Carmen Paige Hull, Calgary (CA); Robert Kosara, Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/139,922

(22) Filed: Dec. 31, 2020

(51) Int. Cl.
*G06T 11/20* (2006.01)

(52) U.S. Cl.
CPC ........ *G06T 11/206* (2013.01); *G06T 2200/24* (2013.01)

(58) Field of Classification Search
CPC .................... G06T 11/206; G06T 2200/24
See application file for complete search history.

(56) References Cited

U.S. PATENT DOCUMENTS

| 6,188,403 B1 * | 2/2001 | Sacerdoti | G06T 11/206 715/764 |
| 6,222,540 B1 * | 4/2001 | Sacerdoti | G06T 11/206 345/581 |
| 2004/0164983 A1 * | 8/2004 | Khozai | G06T 11/206 345/440 |
| 2016/0070430 A1 * | 3/2016 | Kim | G06T 11/206 715/769 |
| 2019/0385348 A1 * | 12/2019 | Lee | G06T 11/60 |

* cited by examiner

*Primary Examiner* — Jeffery A Brier
(74) *Attorney, Agent, or Firm* — Morgan, Lewis & Bockius LLP

(57) ABSTRACT

A computing device generates a first set of glyphs from a first data set. Each glyph in the first set of glyphs represents the same set of user-selected columns in a first row of the plurality of rows in the data set. For each glyph in the first set of glyphs, the computing device defines a set of marks to be displayed. Each mark is defined by one or more visual features, with a respective visual feature assigned to each column of the user-selected columns. Each visual feature is displayed with a visual property determined based on a data value in the first row for the respective column. The computing device generates a second set of glyphs. Each glyph in the second set of glyphs represents a distinct respective row of data values for the user-selected columns in the data set.

20 Claims, 23 Drawing Sheets
(19 of 23 Drawing Sheet(s) Filed in Color)

Figure 3B

GLYPH SCAFFOLDS FOR GENERATING UNIQUE GLYPHS TO USE AS DATA MARKS IN DATA VISUALIZATIONS

TECHNICAL FIELD

The disclosed implementations relate generally to data visualization and more specifically to systems, methods, and user interfaces that enable users to interact with data visualizations to generate glyphs that represent data sets.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks. However, standard data visualization tools are not well-suited to visually depict the data values for many different data fields simultaneously.

SUMMARY

There is a need for improved systems and methods that support interactions with visual analytical systems. The present disclosure describes methods that enable users to visually understand many data fields simultaneously, using glyph designs. The system generates a plurality of glyph designs within a visual analytics system (e.g., a data visualization application). The method further supports generating a plurality of glyph designs that represent the same data so that a user can select a preferred glyph design to be applied to other data in the data set. Thus, the methods and user interfaces reduce the cognitive burden on a user and produces a more efficient human-machine interface.

In accordance with some implementations, a method executes at a computing device having a display, one or more processors, and memory storing one or more programs configured for execution by the one or more processors. Execution of the method enables users to visualize many distinct data fields (also referred to as "columns") in a data source simultaneously.

The device receives user selection of a data set, which includes a plurality of columns and a plurality of rows. A user (or the device) selects a subset of the columns to be included in a data visualization for the data set. The data visualization will include glyphs corresponding to rows in the data set. The device generates a first plurality of glyphs for a first row in the data set, where: (i) each glyph includes a respective plurality of visual marks; (ii) each visual mark is defined by a respective set of one or more visual features; (iii) each of the visual features is assigned to a respective column in the subset of columns; and (iv) each visual feature is displayed according to a corresponding visual property determined by a respective data value in the first row for the respective column. The device then receives user selection of a first glyph in the first plurality of glyphs. The first glyph includes a first plurality of visual marks, and each of the first plurality of visual marks is defined by a respective first set of one or more visual features. In response to the user selection of the first glyph, the device generates a second plurality of glyphs, each glyph in the second plurality of glyphs representing a respective distinct row in the data set.

Each of the glyphs in the second plurality of glyphs uses the format specified by the visual marks and visual properties of the first glyph, but applies the format to a distinct row of data from the data source. In particular, (i) each glyph in the second plurality of glyphs includes a respective first set of visual marks; (ii) each of the visual marks in the respective first set is displayed according to the respective first set of one or more visual features; and (iii) each visual feature of the respective first set of visual features is displayed according to the corresponding visual property determined by a respective data value for the respective column in the respective distinct row.

In some implementations, one or more of the columns in the data set are aggregated.

In some implementations, the one or more visual features include one or more of color, shape, size, and position.

In some implementations, each of the visual features is assigned to a respective column according to user input.

In some implementations, each of the visual features is automatically assigned to a respective column according to a respective determined data type for the respective column.

In some implementations, generating the first plurality of glyphs includes automatically selecting the one or more visual features that define each mark of the one or more marks.

In some implementations, two or more columns are assigned to a same visual feature.

In some implementations, the visual marks, for a first glyph of the first plurality of glyphs, are equally spaced around a visual model.

In some implementations, the device receives user specification of a specific visual feature for a first visual mark of a first glyph in the second plurality of glyphs. In response to the user specification of the specific visual feature, the device generates a third plurality of glyphs. Each glyph in the third plurality of glyphs includes a respective first mark with the specific visual feature.

In some implementations, the data set is included in a worksheet of a data visualization program.

According to some implementations, a method is provided for generating sets of glyphs for a data set. The method is performed at a computing device having a display, one or more processors, and memory storing one or more programs configured for execution by the one or more processors. The method includes receiving user selection of a data set, the data set including a plurality of columns and a plurality of rows. The method further includes selecting a subset of the plurality of columns to be included in a data visualization for the data set, the data visualization including glyphs corresponding to rows in the data set. The method includes generating a first set of glyphs. Each glyph in the first set of glyphs represents the same set of columns in a first row of the plurality of rows in the data set. For each glyph in the first set of glyphs, the method includes defining a set of marks to be displayed. Each mark is defined by one or more visual features. The system assigns a respective visual feature of the one or more visual features to each column of the subset of columns. Each visual feature is displayed with a visual property determined based on a data value for the first row for the respective column. The method includes receiving user selection of a first glyph in the first set of glyphs. The first glyph is defined by a first set of marks having a first set of respective visual features that are assigned to the subset of columns. The method further includes, in response to the user selection of the first glyph, generating a second set of glyphs. Each glyph in the second set of glyphs represents a respective row of data values for the subset of columns. Each glyph in the second set of glyphs includes the first set of marks and the first set of respective visual features that are assigned to the subset of respective columns. Each visual feature is displayed with a visual property determined based on a data value for each row.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily visualize and analyze many distinct data fields simultaneously.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 3B shows a glyph specification array, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
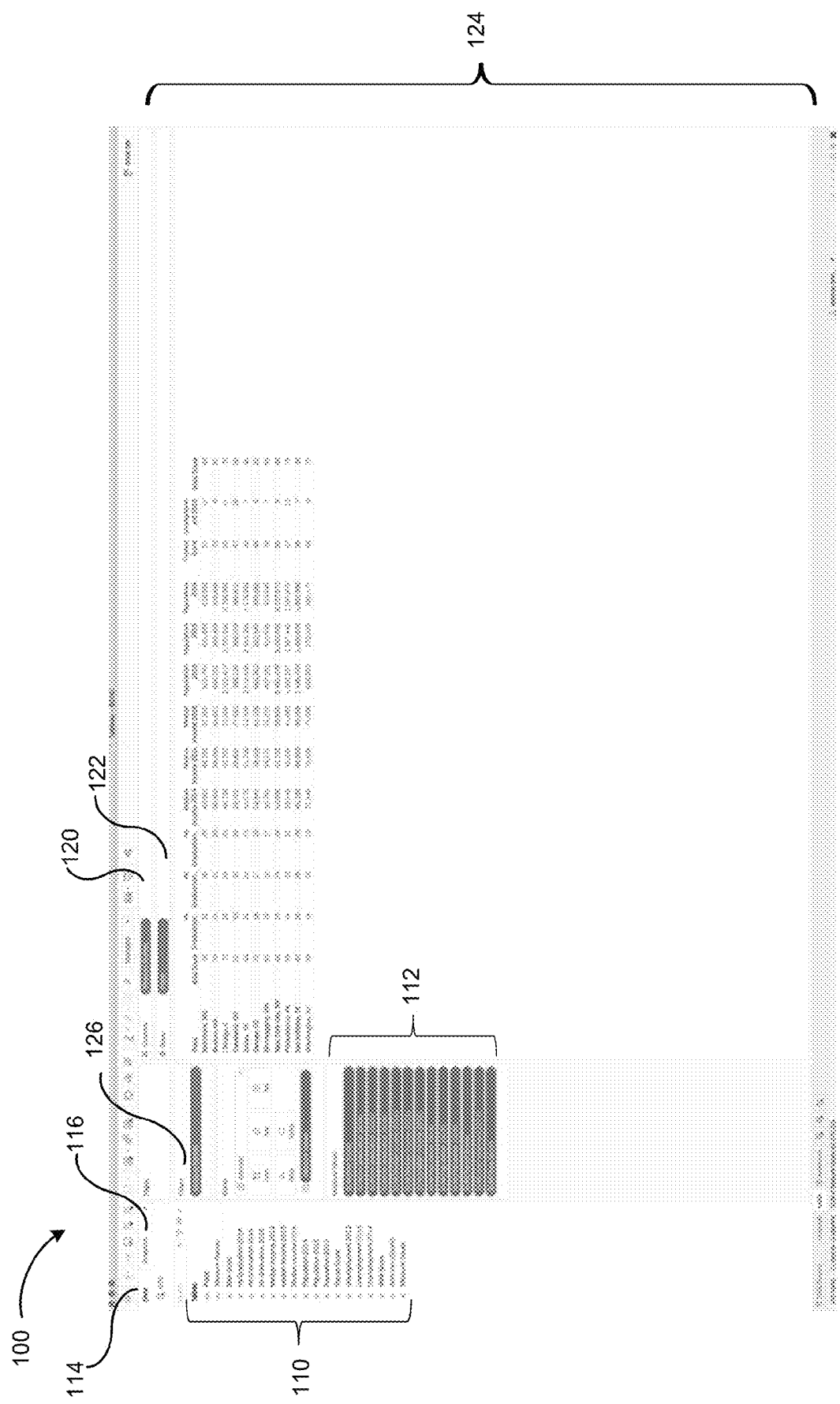
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names and/or column names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 124. The data visualization region 124 includes a plurality of shelf regions, such as a columns shelf region 120 and a rows shelf region 122. These are also referred to as the column shelf 120 and the row shelf 122. As illustrated here, the data visualization region 124 also has a large space for displaying a visual graphic (also referred to herein as a data visualization). Because "Measure Names" has been selected in column shelf 120 and "place" has been selected in row shelf 122, a corresponding visual graphic (e.g., table) is displayed in the data visualization region 124. In some implementations, the data visualization region 124 has multiple layers that are referred to as sheets. In some implementations, the data visualization region 124 includes a region 126 for data visualization filters. In some implementations, the data visualization region 124 includes a region 112 for aggregating measure values. For example, region 112 includes SUM (Bike Score) where "Bike Score" is also in the schema information region 110. Thus, the measure values displayed for a particular data field represent the aggregated SUM of the data (e.g., Bike Score).

Figure 2:
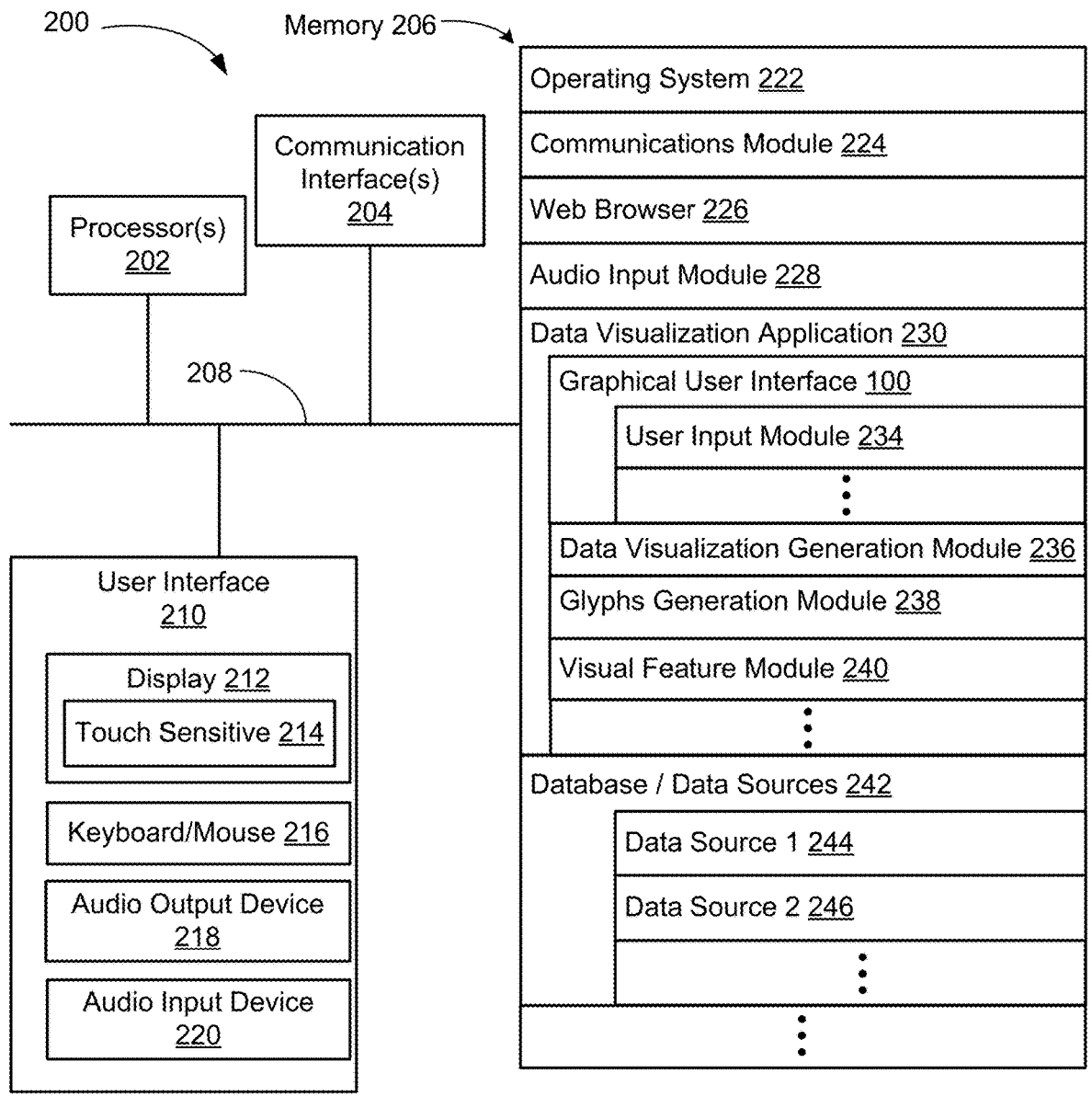
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- optionally, a web browser 226 (or other application capable of displaying web pages), which enables a user to communicate over a network with remote computers or devices;
- optionally, an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. In some implementations, the data visualization application 230 includes:
  - a graphical user interface 100 for a user to construct visual graphics. In some implementations, the graphical user interface includes a user input module 234 for receiving user input through the natural language box. For example, a user inputs a natural language command or expression into the natural language box identifying one or more data sources 242 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server;
  - a data visualization generation module 236, which automatically generates and displays a corresponding visual graphic (also referred to as a "data visualization" or a "data viz") using the user input (e.g., the natural language input);
  - a glyphs generation module 238 for generating glyphs using data sets stored in a database (e.g., the database/data sources 242). In some implementations, the glyphs generation module assigns, without user input, a particular column to a visual feature of a glyph. In some implementations, the glyphs generation module receives user input that assigns a particular column to a visual feature of a glyph. In some implementations, the glyphs generation module receives user input indicating one or more visual features and generates additional glyphs in accordance with the one or more visual features (e.g., iteratively generates glyphs to match preferences selected by a user);
  - visual feature module 240, which is used to define characteristics of a desired data visualization, including sets of marks, visual features for the sets of marks, and one or more visual properties for the visual features. In some implementations, the information the user provides (e.g., user input) is stored to define a particular visual feature (e.g., assign the visual feature to a column); and
- zero or more databases or data sources 242 (e.g., a first data source 244 and a second data source 246), which are used by the data visualization application 230. In some implementations, the data sources are stored as spreadsheet files, CSV files, XML files, flat files, or JSON files, or stored in a relational database. For example, a user selects one or more databases or data sources 242 (which may be stored on the computing device 200 or stored remotely), selects data fields from the data source(s), and uses the selected fields to define a visual graphic.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Generating Glyphs

Figure 3A:
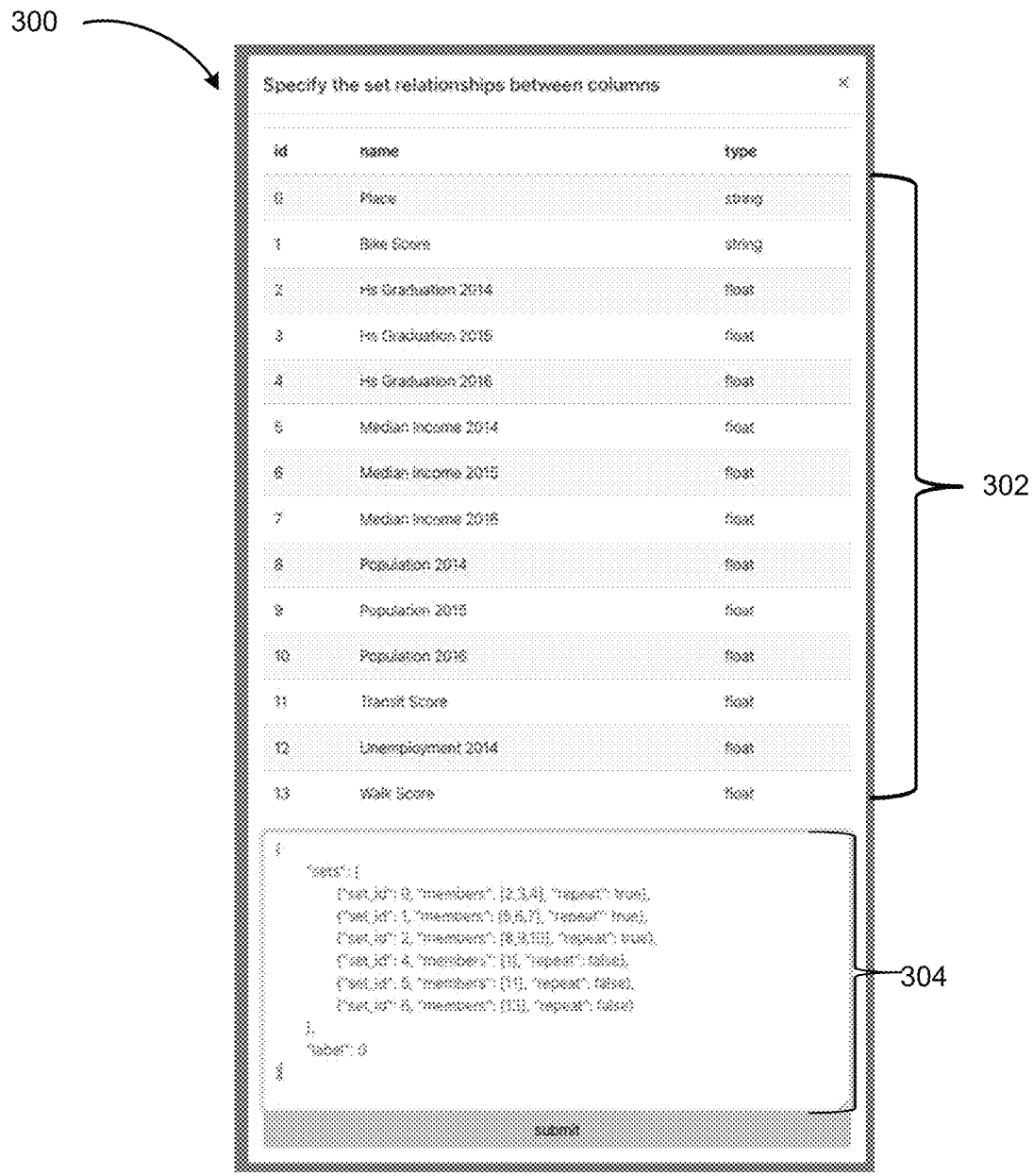
FIG. 3A illustrates a graphical user interface for specifying relations between columns, according to some implementations.
Figure 4:
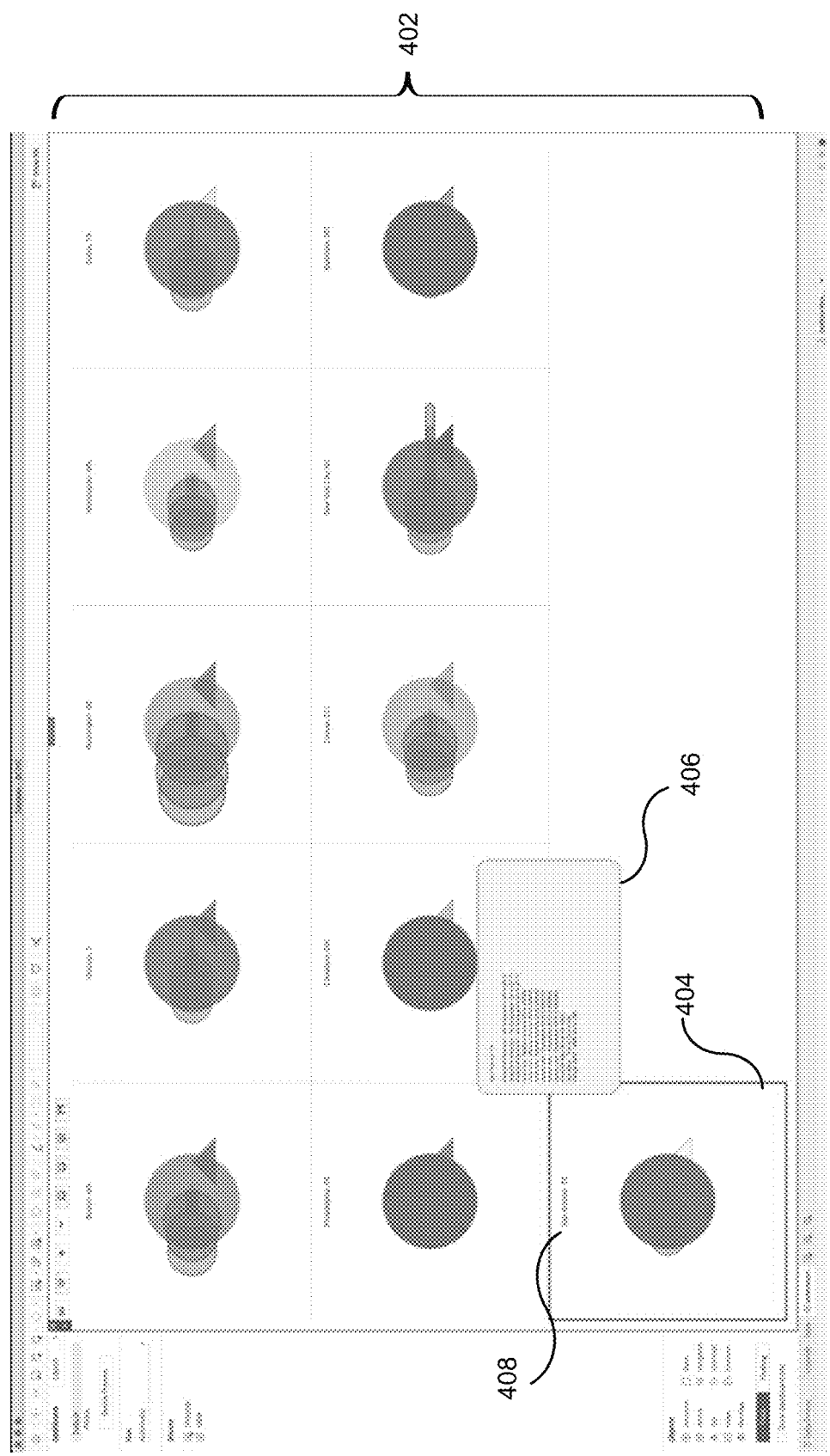
FIG. 4 shows an example set of glyphs generated for a first data set, in accordance with some implementations.

FIG. 3A illustrates a user interface 300 for specifying relationships between columns in a first data set. For example, the columns 302 (e.g., listed under "name") correspond to the columns, defined by "Measure Names" in column shelf 120, illustrated in FIG. 1. For example, each of the columns "Bike Score", "Hs Graduation . . . ", "Median Income 2014", "Median Income 2015", "Median Income 2016", "Population 2014", "Population 2015", "Population 2016", "Transit Score", "Unemployment 2014", and "Walk Score" that are displayed in the table in data visualization area 124 of FIG. 1 are listed as columns 302 in the user interface 300 illustrated in FIG. 3A. Each of these columns is assigned an "id" (e.g., a numeric id from 0 to 13) in FIG. 3A. Each of the columns also has a data type, identifying the column as a string, a float (floating point numbers), or other data type. A string data type is typically used as a dimension, while data fields with floating point values are typically measures. For example, column "place" has a string type and possible data values for the column place are places, such as Boston, Chicago, or Washington D.C. (e.g., the different data fields are illustrated in FIG. 4). Other columns, such as "Median Income 2014", have a "float" data type, indicating that the data values within the column are numeric values.

FIG. 3A also includes a text box area 304 that shows how individual data fields are assigned to sets. Each of the sets corresponds to a distinct mark that will be used to generate the glyphs. In some implementations, the information displayed in text box area 304 is generated by the system. In some implementations, users are able to enter or update the data in this text box area. When entered by a user, the system provides a simplified user interface so that the user does not have to remember the specific syntax or know internal ID numbers assigned to each of the data fields.

As illustrated, there are six sets of data fields, with set ids 0, 1, 2, 4, 5, and 6, and each of the data fields within each set will determine a specific visual encoding (e.g., visual features mapped to a mark, such as its shape, size, position, or fill color).

For example, the three HS graduation columns (which have ID values 2, 3, and 4, are all assigned to the set with set_id="0." Thus, the three HS graduation columns [2, 3, 4] are bound together to be assigned a shared mark in the generated glyph. Similarly, the three Median Income columns [5, 6, 7] are assigned to the shared set id "1," and the three Population columns [8, 9, 10] are assigned to the shared set id "2." In some implementations, the "repeat" flag indicates that the columns in the set can be repeated for other sets. In some implementations, the final flag on each row ("true" or "false") indicate whether the set has more than a single column.

Three other columns shown (i.e., Bike Score, Transit Score, and Walk Score) are in singletop set (e.g., set_id: 4, set_id: 5, and set_id: 6) to represent Bike Score (with column id [1]), Transit Score (with column id [11]), and Walk Score (with column id [13]) columns, respectively. Column id 0 (e.g., "Place") is used as a label (e.g., "label": 0) for each glyph according to the specification of text box area 304. It will be noted that not all columns in the data set need to be selected (e.g., unemployment 2014 (column id 12) is not assigned a set_id in text box area 304). In some implementations, only selected columns are included in the generated glyphs (e.g., there is no visual representation for columns that are not selected).

Figure 3B:
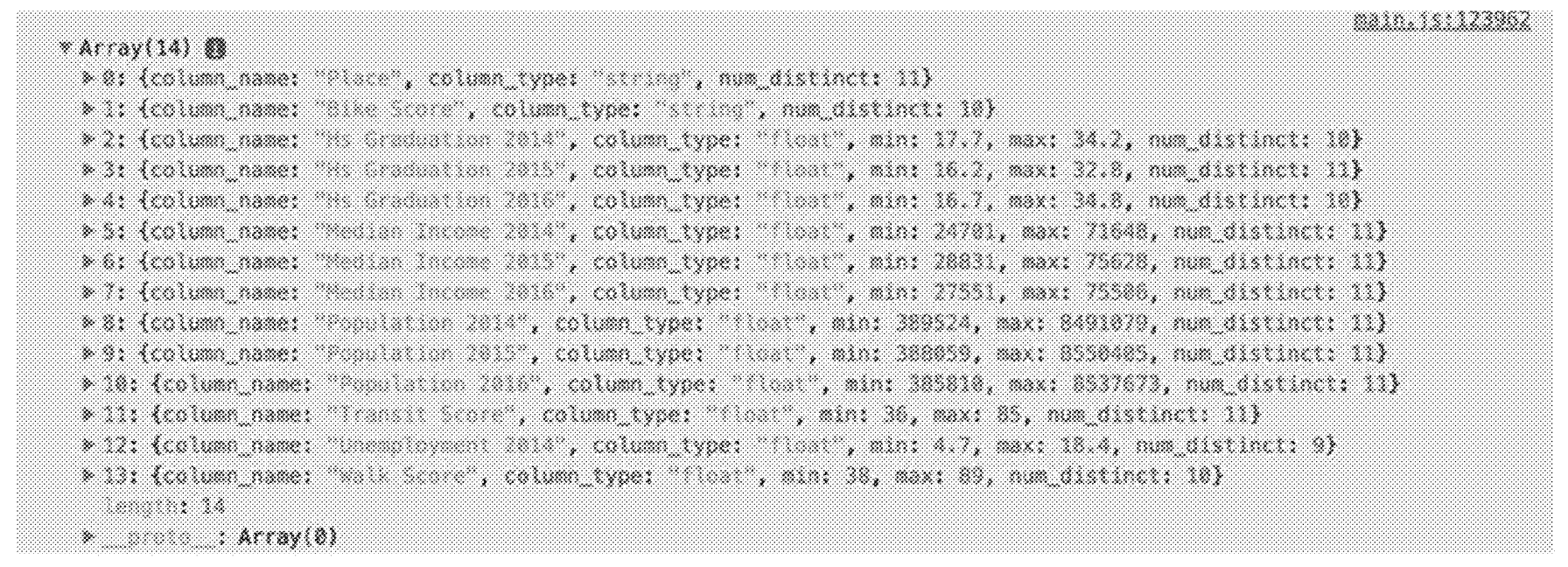

FIG. 3B provides an array of the data fields (columns) shown in FIG. 3A. This array identifies the data types for each of the data fields, the minimum and maximum values for each of the data fields, a a count of the distinct data values for the data field.

FIG. 4 illustrates a first set of glyphs based on the specification outline in text box area 304, illustrated in FIG. 3A. In some implementations, the first set of glyphs 402 is referred to as a "small multiples" grid in which each row from the crosstab is drawn according to the instructions provided by the first glyph in the glyph_specs array shown in FIG. 3B.

FIG. 4 also highlights the "San Antonio" cell 404. In some implementations, a tooltip 406 is generated and displayed in the user interface. For example, the tooltip 406 describes how the encoding of the glyph for the selected cell (e.g., San Antonio) is generated. For example, the tooltip 406 recites:

San Antonio, Tex.
sharpSoft distortion: HS Graduation 2014 (26.2)
sharpSoft distortion: HS Graduation 2015 (27.7)
sharpSoft distortion: HS Graduation 2016 (27.7)
circle Size: Median Income 2014 (45339)
circle Size: Median Income 2015 (48869)
circle Size: Median Income 2016 (49268)
square size: Population 2014 (1436723)
square size: Population 2015 (1469824)
square size: Population 2016 (1492494)
chord fill: Bike score (42.0000)
rect alpha: Transit Score (36)
triangle alpha: Walk Score (38)

In this example, each visual feature, as defined as the left-most entry on each line in the tooltip (other than the line with the label "San Antonio"), is assigned to a particular column, as defined after the colon on each line in the tooltip, and the data value (e.g., corresponding to the respective column for the row of "San Antonio, Tex.") is shown in parentheses. For example, "sharpSoft distortion" is the visual feature that is assigned to columns HS Graduation 2014, HS Graduation 2015, and HS Graduation 2016, "circle Size" is the visual feature that is assigned to columns Median Income 2014, Median Income 2015 and Median Income 2016, "square size" is the visual feature that is assigned to columns Population 2014, Population 2015, and Population 2016, "chord fill" is the visual feature that is assigned to the column "Bike score," "rect alpha" is the visual feature that is assigned to the column Transit score, and "triangle alpha" is the visual feature that is assigned to the column Walk Score. For each of these visual features that is assigned to the columns, the visual property with which the visual feature is displayed is determined by the data value for the respective column and row.

In the set of glyphs 402 in FIG. 4, each cell assigns the same visual property to the same columns as illustrated in the tooltip 406. For example, each cell represents a different row in the data set. For example, each label is the data value for the column "Places" and the data value defining each visual feature is based on the data value for the respective column and the row. For example, the label 408 for the cell 404 recites "San Antonio, Tex.," which corresponds to the data value for the column "Places" for the set of data represented in the glyph of the cell 404.

In some implementations, the size and position of the glyphs displayed in the small multiples grid 402 shown in FIG. 4 is determined by the number of rows (e.g., data fields) in the data set. For example, there are 11 values of "places", and a cell with a glyph is displayed for each of the 11 values.

Figure 5A:
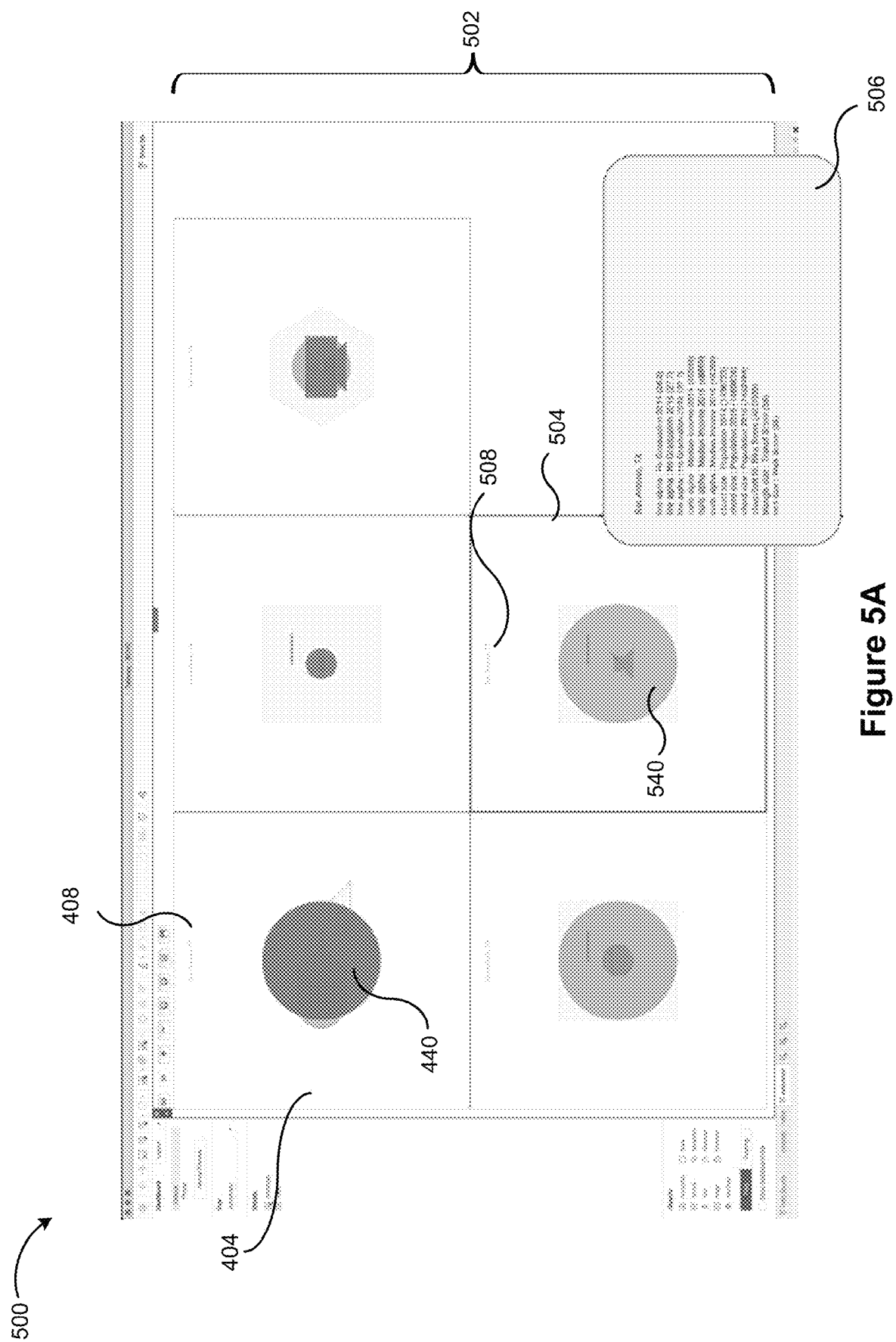
FIG. 5A shows an alternative set of glyphs generated for the first data set, according to some implementations.

In some implementations, a user selects a cell from the small multiples grid. For example, the user selects (e.g., clicks) on the San Antonio, Tex. cell 404. In response to the user selecting a cell from the small multiples grid, a second set of glyphs 502 (e.g., a small permutables grid mode) is generated, as illustrated in FIG. 5A. It will be understood that in some implementations, a button or other user interface element is provided, and that, when selected, causes the device to switch between modes of glyph grids. For example, a user can switch between the small multiples grid illustrated in FIG. 4 and a small permutables grid mode as illustrated in FIG. 5A.

FIG. 5A illustrates a second set of glyphs, displayed in a small permutables grid mode, in accordance with some implementations. For example, in FIG. 5A, each cell in the grid of glyphs represents the same row (e.g., data field) from the data set. For example, each cell is labeled "San Antonio, Tex.," which is the data value that corresponds to a single data field column 0 ("Places") from the data set. For example, the label 408 recites "San Antonio, Tex." and the label 508, for a different cell with a different glyph, is also labeled "San Antonio, Tex." Each glyph in FIG. 5A represents the same row of data, corresponding to the "San Antonio, Tex." data field. However, unlike in FIG. 4 in which for each glyph, the same set of visual features are assigned respective columns in the data set, in FIG. 5A, visual features for each glyph are assigned to different columns compared to the other glyphs in the set.

For example, the first glyph illustrated in the top left cell 404 is the same glyph as illustrated in the cell 404 of FIG. 4 in which the visual features are assigned according to the assignments that were illustrated in the tooltip 406 of FIG. 4.

FIG. 5A also illustrates glyphs that assign visual features to different columns than the visual features that were assigned to respective columns in FIG. 4. This creates the different glyph designs illustrated in FIG. 5A. For example, in response to a user hovering over the bottom right glyph, a tooltip 506 is generated. Tooltip 506 describes the encoding for the selected cell. For example, the Tooltip 506 recites:

San Antonio, Tex.
line alpha: HS Graduation 2014 (26.2)
line alpha: HS Graduation 2015 (27.7)
line alpha: HS Graduation 2016 (27.7)
curls alpha: Median Income 2014 (45339)
curls alpha: Median Income 2015 (48869)
curls alpha: Median Income 2016 (49268)
chord size: Population 2014 (1436723)
chord size: Population 2015 (1469824)
chord size: Population 2016 (1492494)
sharpSoft fill: Bike score (42.0000)
triangle size: Transit Score (36)
rect size: Walk Score (38)

As described in tooltip 506, for the glyph 540, each of the columns are assigned to a different visual feature than in the glyph 440 (as described in the tooltip 406, in FIG. 4). By altering the assignment of columns to visual features, different glyph designs are produced that represent the same data. For example, each of the glyphs in the second set of glyphs 502 shown in FIG. 5A represent the exact same data: for the row (e.g., data field) of San Antonio, Tex., and the columns HS Graduation, median Income, Population, Bike score, Transit Score and Walk Score. The data values across the columns for this row do not change (e.g., Transit score has a data value of 36, and this data value is represented in each glyph in the set of glyphs 502), but the glyph designs vary as the columns are assigned to different combinations of visual features.

In some implementations, each glyph is designed around a particular scaffold (e.g., a governing geometric configuration), such as a horizontal line, a square, a hexagon, or a circle, and each glyph has an X and Y position (e.g., determined with reference to the scaffold). In some implementations, the scaffold is determined randomly. For example, each glyph in the small permutables table may be designed around a different scaffold.

In some implementations, the glyph scaffold for a glyph is selected from one of the following glyph scaffolds: horizontal rectangle, vertical rectangle, triangle, circle, square, hexagon, octagon, and spiral.

Each glyph also includes a set of marks. For example, the marks have visual features that can be displayed with varying visual properties according to data values. In some implementations, the marks are based on the column metadata for members of the set and encoding properties. In some implementations, the mark shape is selected from a mark shape palette including: drop (e.g., a raindrop/teardrop), rectangle (e.g., "rect," which may or may not be notched), triangle (e.g., which may or may not be notched), ellipse (e.g., which may or may not be notched), and wave. In some implementations, the visual feature for the mark is selected from a group of mark options. In some implementations, the mark options are different for different types of data. For categorical data (e.g., a column with data values that correspond to a string) the mark options include, for example, fill color and stroke color. For numerical data (e.g., a column with data values that correspond to a numeric value), the mark options may include, for example, size, alpha, rotation, stroke weight, length, frequency, and amplitude. It will be understood that additional and alternative mark options may be used. Mark options include any visual feature that may be used to vary the appearance of the mark. It will also be understood that different shapes have different mark options. For example, frequency is a mark option for a wave shape, while frequency may not be a mark option for a triangle shape.

Figure 5B:
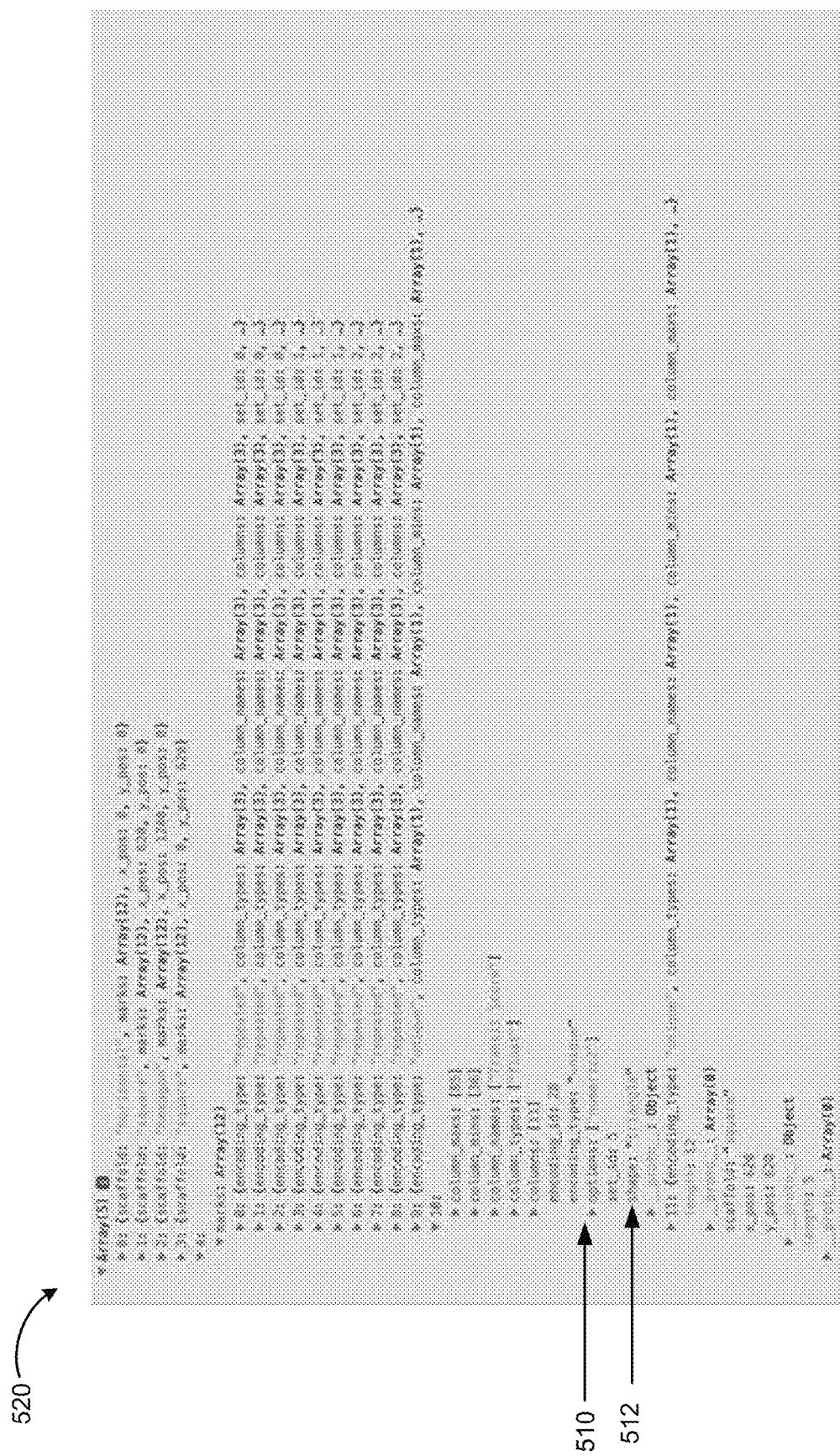
FIG. 5B shows a glyph specification array, according to some implementations.

In the selected glyph 540 in the cell 504, the triangle shown in the glyph represents a "mark." The mark is specified according to the array 520 illustrated in FIG. 5B.

The array 520 shown in FIG. 5B defines "shape" 512 and "options," 510 which, in this example, are selected via random sampling from a palette (e.g., a shape palette that includes selection from a basic list of shapes, such as circle, line, rectangle, square, triangle, etc.). Here, the "shape" 512 is assigned "triangle" and the "options" 510 is assigned a single option: "numeric2" (e.g., a single option is selected because only a single column is associated with this mark)—which can be transformed by the computing device to a visual feature, such as a size, position, fill alpha. Here, "numeric2" corresponds to the visual feature of a "size" of the mark (as indicated in tooltip 506 shown in FIG. 5A).

Figure 6A:
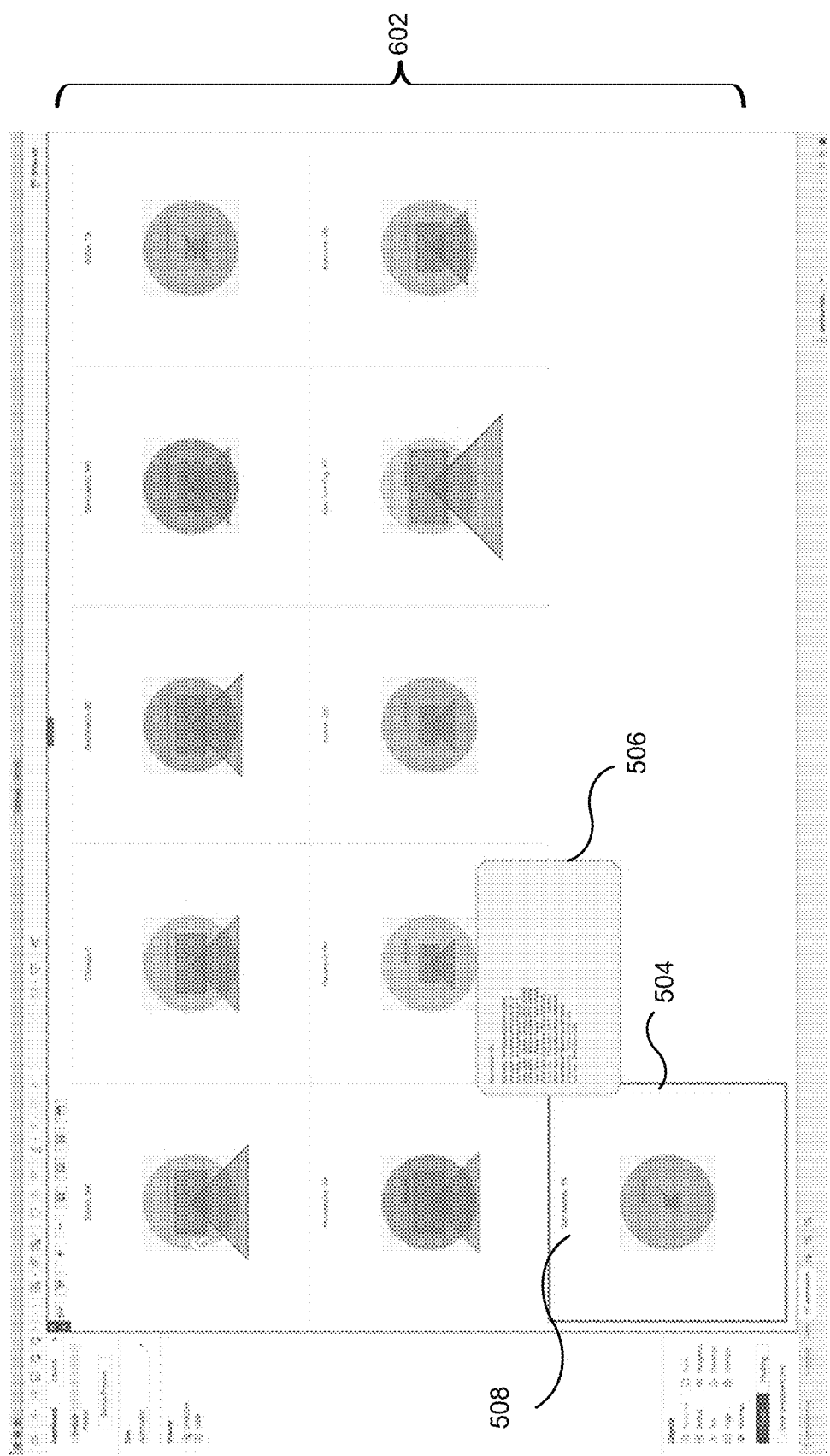
FIGS. 6A and 6B provide an example set of glyphs generated for the first data set according to a selected glyph specification, according to some implementations.

FIG. 6A illustrates the selected glyph design (e.g., as defined by which columns are assigned to particular visual features) as applied to other rows of data in the data set. In some implementations, the set of glyphs 602 is referred to as the set of glyphs in a small multiples grid mode. For example, the glyph design in the bottom left is the same glyph design illustrated in the glyph of cell 504 in FIG. 5A. Once the user selects this glyph design, the glyph design is applied to the other rows of data in the data set (e.g., the other "Places" such as Boston, Chicago, and Washington D.C.). Each of the glyphs in the set of glyphs 602 illustrated in FIG. 6A appear to be different because the visual properties (e.g., "orange," "green," "red," or "purple") for each visual feature (e.g., circle color) change in accordance with the data value for that particular data field, while the same visual feature is assigned to the same column across each glyph.

For example, a visual feature "circle color" is assigned to a particular column in the data set, and based on the data value for the column and data field, the color is displayed with a different visual property (e.g., orange, green, red, purple, or blue). As another example, a visual feature "triangle size" is assigned to column Transit Score. For each glyph illustrated in FIG. 6A, the size of the triangle varies between glyphs according to the data value for the "Transit Score" for the data field (e.g., place). For example, the New York City triangle size is larger than the San Antonio triangle size because the Transit Score for New York City is 85, while the Transit Score for San Antonio is 36.

Figure 6B:
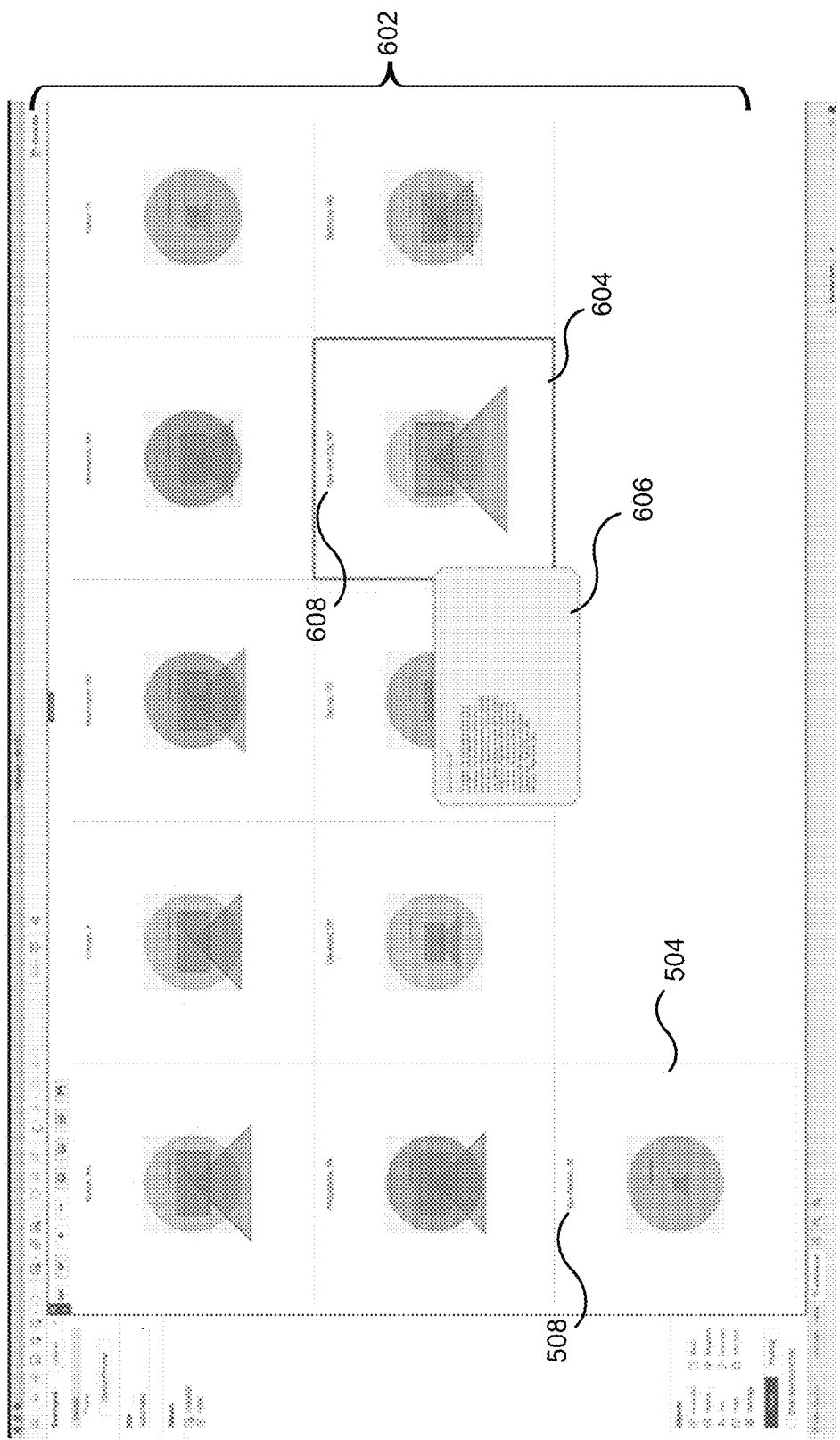

FIG. 6B illustrates a user selecting (e.g., hovering over) a glyph design in the cell 604 corresponding to New York City (the label 608 recites "New York City, N.Y."). In response to the user selection, a tooltip 606 is displayed. Tooltip 606 describes the encoding for the selected cell. For example, Tooltip 606 recites:

New York City, N.Y.
line alpha: HS Graduation 2014 (24.2)
line alpha: HS Graduation 2015 (23.9)
line alpha: HS Graduation 2016 (24.2)
curls alpha: Median Income 2014 (52996)
curls alpha: Median Income 2015 (55752)
curls alpha: Median Income 2016 (58856)
chord size: Population 2014 (8491079)
chord size: Population 2015 (8550405)
chord size: Population 2016 (8537673)
sharpSoft fill: Bike score (65.0000)
triangle size: Transit Score (85)
rect size: Walk Score (89)

Note that the tooltip 606 assigns the same visual features to the same columns as the tooltip 506. The only difference between the tooltips is the data values (shown in parentheses in the tooltip) for the columns for the respective data field (e.g., San Antonio in the cell 504 described by the tooltip 506 vs New York City in the cell 604 described by the tooltip 606).

Figure 7A:
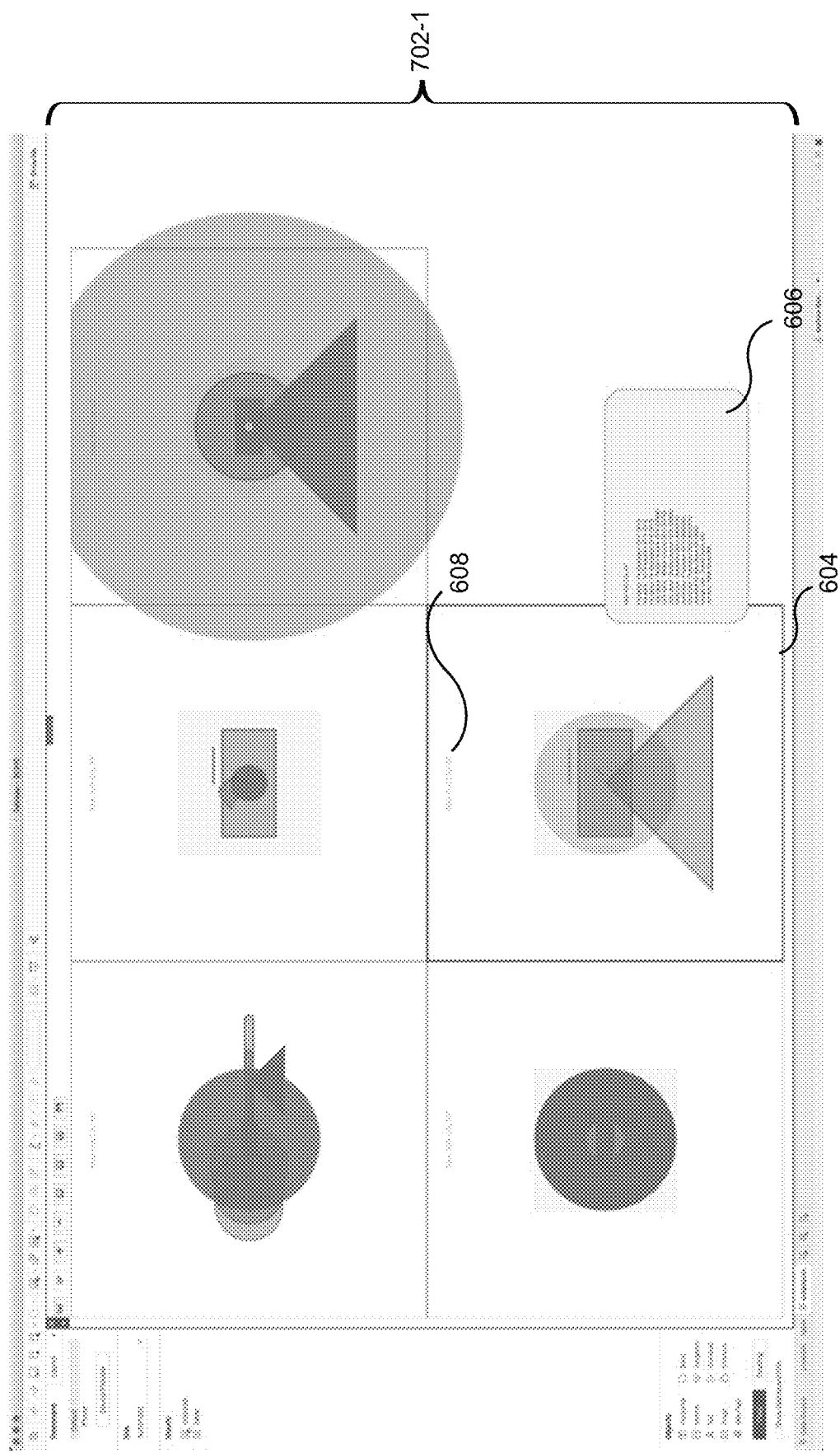
FIGS. 7A and 7B provide sets of glyphs generated according to user selection, according to some implementations.

FIG. 7A illustrates a set of glyphs 702-1 generated for the same data field (e.g., New York City) selected in the glyph cell 604 in FIG. 6B. For example, FIG. 7A illustrates a plurality of glyphs that represent the same set of data (e.g., the same data values for the columns for the data field corresponding to New York City). FIG. 7A illustrates a small permutables grid mode (e.g., displayed as set of the glyphs 702-1) using New York City as the selected row of data (whereas FIG. 5A illustrates a small permutables grid mode using San Antonio as the selected row of data).

Figure 7B:
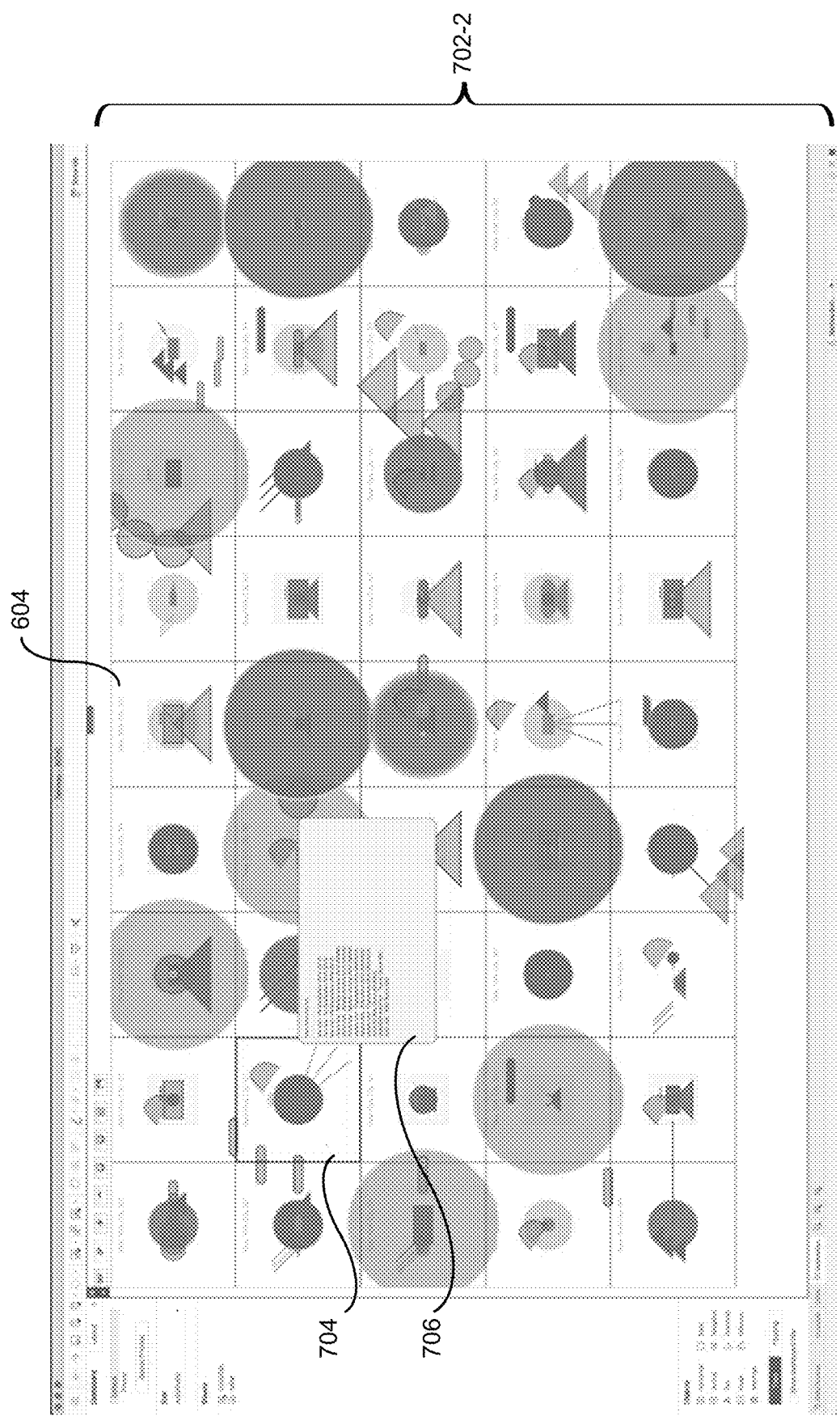

FIG. 7B illustrates additional glyphs in a set of glyphs 702-2 generated for the same data row. For example, in addition to the 5 glyphs illustrated in FIG. 7A (including the glyph in cell 604) (e.g., the left-most 5 glyphs in the top row of FIG. 7B are the same as the 5 glyphs illustrated in FIG. 7A), FIG. 7B illustrates that the computing device is enabled to generate and display additional glyphs for the same data field (e.g., an expanded small permutables grid mode using New York City as the selected row of data). It will be understood that some of the glyphs extend beyond their cell area and appear to overlap with other glyph cells. In some implementations, the glyph_specs array is updated to contain 45 entries, representing the 45 glyphs illustrated in FIG. 7B.

While viewing the set of glyphs 702-2, the user is able to select a particular glyph design that the user would like to apply to the other "Places" by selecting a cell in the set of glyphs 702-2. For example, the user selects (e.g., hovers over) the cell 704. In response to the user hovering over the cell 704, tooltip 706 is displayed. A zoomed-in view of the cell 704 and the tooltip 706 are illustrated in FIG. 7C.

Figure 7C:
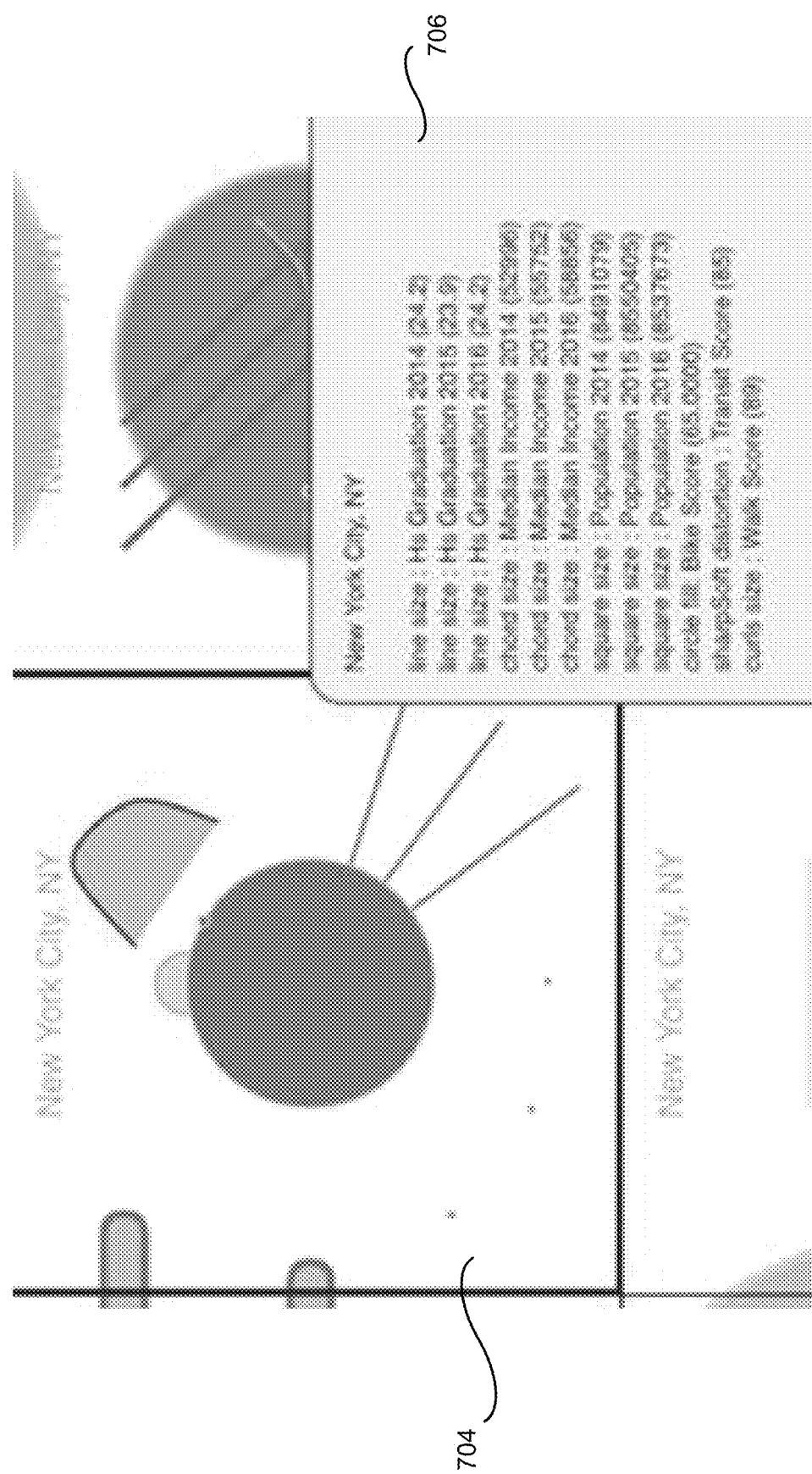
FIG. 7C provides a detailed view of a glyph and its associated description, including assignment of visual features to columns, according to some implementations.

FIG. 7C is a zoomed-in view of the glyph selected in FIG. 7B. FIG. 7C illustrates an alternative glyph design (e.g., selected from the set of glyphs shown in FIG. 7B). For example, the alternative glyph design assigns the columns to different visual features than the glyph selected in FIG. 7A. For example, the tooltip in FIG. 7C shows which visual features are assigned to the columns:

line size: HS Graduation 2014 (24.2)
line size: HS Graduation 2015 (23.9)
line size: HS Graduation 2016 (24.2)
chord size: Median Income 2014 (52996)
chord size: Median Income 2015 (55752)
chord size: Median Income 2016 (58856)
square size: Population 2014 (8491079)
square size: Population 2015 (8550405)
square size: Population 2016 (8537673)
circle fill: Bike score (65.0000)
sharpSoft distortion: Transit Score (85)
curls size: Walk Score (89)

Figure 8:
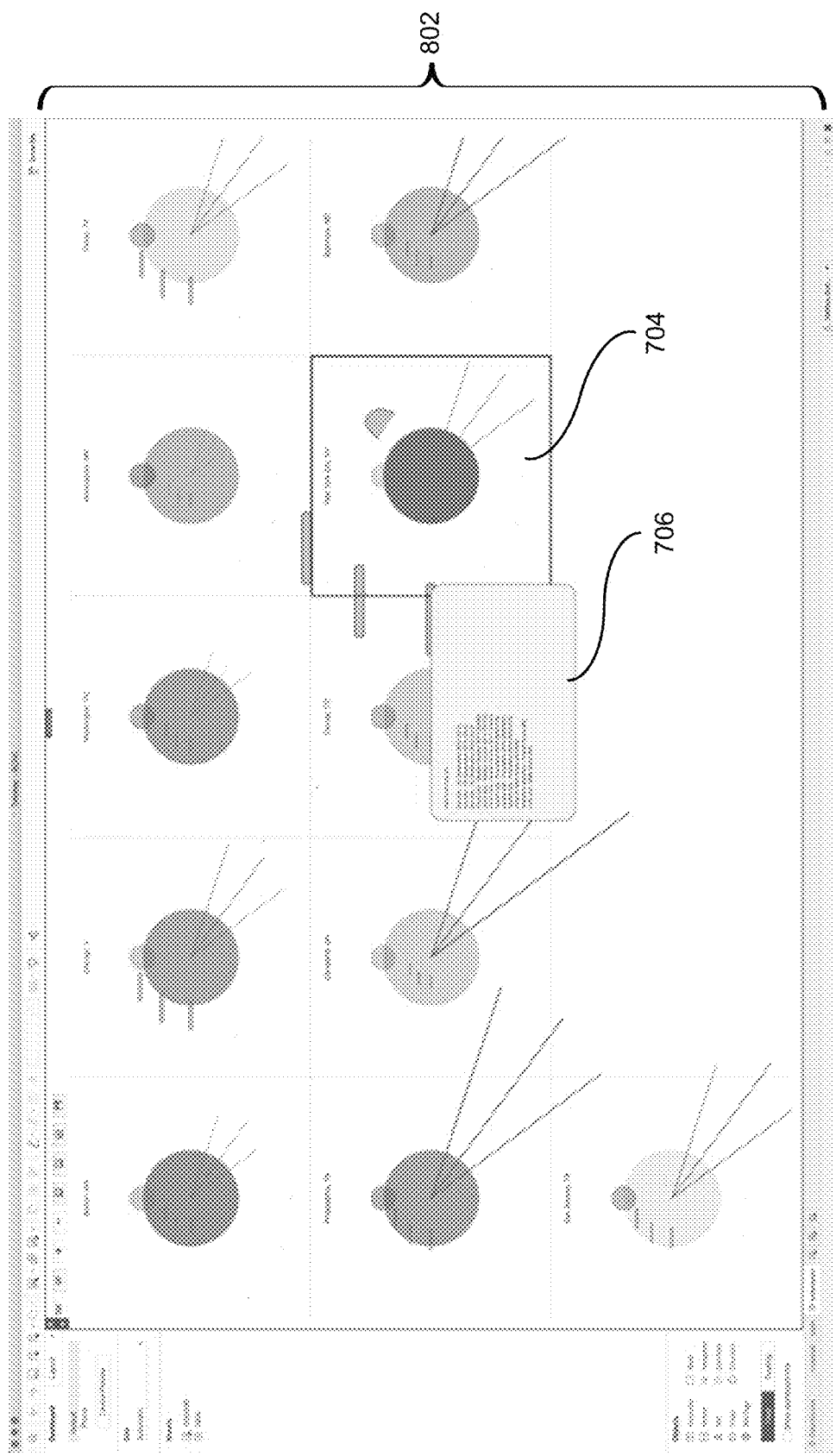
FIG. 8 illustrates a set of glyphs generated for a set of data using the glyph design shown in FIG. 7C, according to some implementations.

FIG. 8 illustrates that, after user selection of the glyph design in cell 704 in FIG. 7C, a set of glyphs 802 (e.g., displayed in a small multiples grid mode) is generated for other rows in the data set (e.g., in addition to New York City). For example, the set of glyphs 802 includes a glyph for Boston, Mass., Chicago, Ill., Washington, D.C., Minneapolis, Minn., Dallas, Tex., Philadelphia, Pa., Cleveland, Ohio, Denver, Colo., New York City, N.Y., Baltimore, Md., and San Antonio, Tex. (e.g., a glyph for each of the 11 data values of "Places" in the data set). For example, in FIG. 8, the visual features are assigned to the same columns in each glyph, and the difference in appearance is due to the various data value for each respective data field (e.g., Cleveland has different data values than New York City, and that results in different appearances in the glyphs).

Figure 9:
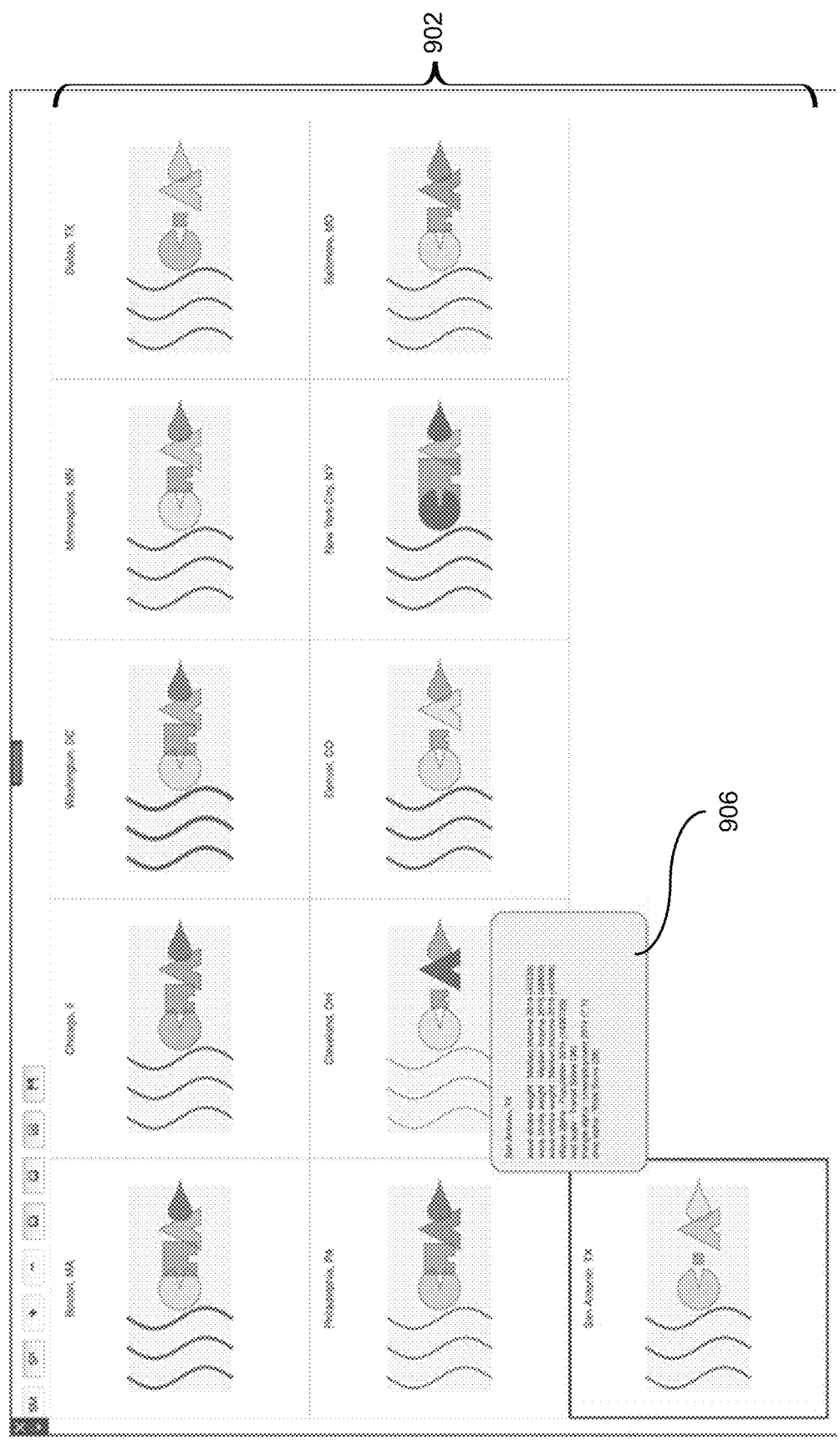
FIG. 9 illustrates an alternative set of glyphs, using a different glyph design than the one used in FIG. 8.

FIG. 9 illustrates another set of glyphs 902 (e.g., displayed in a small multiples grid mode) generated with different visual features assigned to the columns. In this example shown in FIG. 9, a different set of columns in the set of data is selected (e.g., as indicated by the tooltip 906). For example, the three columns for Median Income 2014, 2015 and 2016 are included and assigned to the visual feature "wave stroke weight", the column Population 2014 is included and assigned to the visual feature "ellipse alpha" (and Population 2015 and Population 2016 are excluded), the columns Transit Score is included and assigned to visual feature "rect scale," the column Unemployment 2014 is included and assigned to visual feature "triangle alpha" and the column Walk Score is included and assigned to visual feature "drop alpha." It will be understood that the columns represented in the sets of glyphs may be varied (with or without user input). For example, the user may update the specification written in text box area 304 of FIG. 3A to change which columns (e.g., and how the columns are bound) to include in the generated glyphs.

Figure 10A:
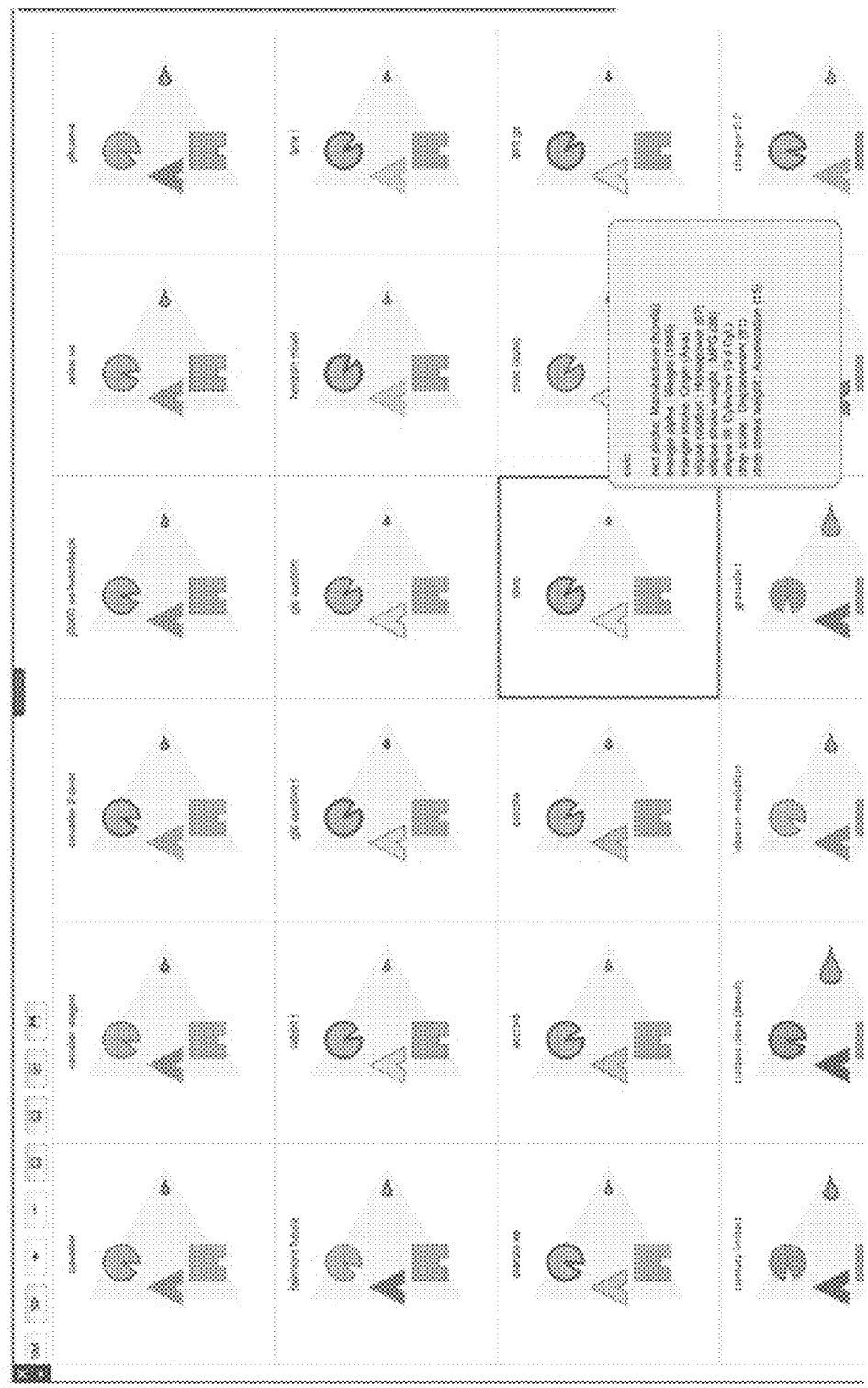
FIGS. 10A-10C illustrate glyph designs for a set of data according to some implementations.
Figure 10B:
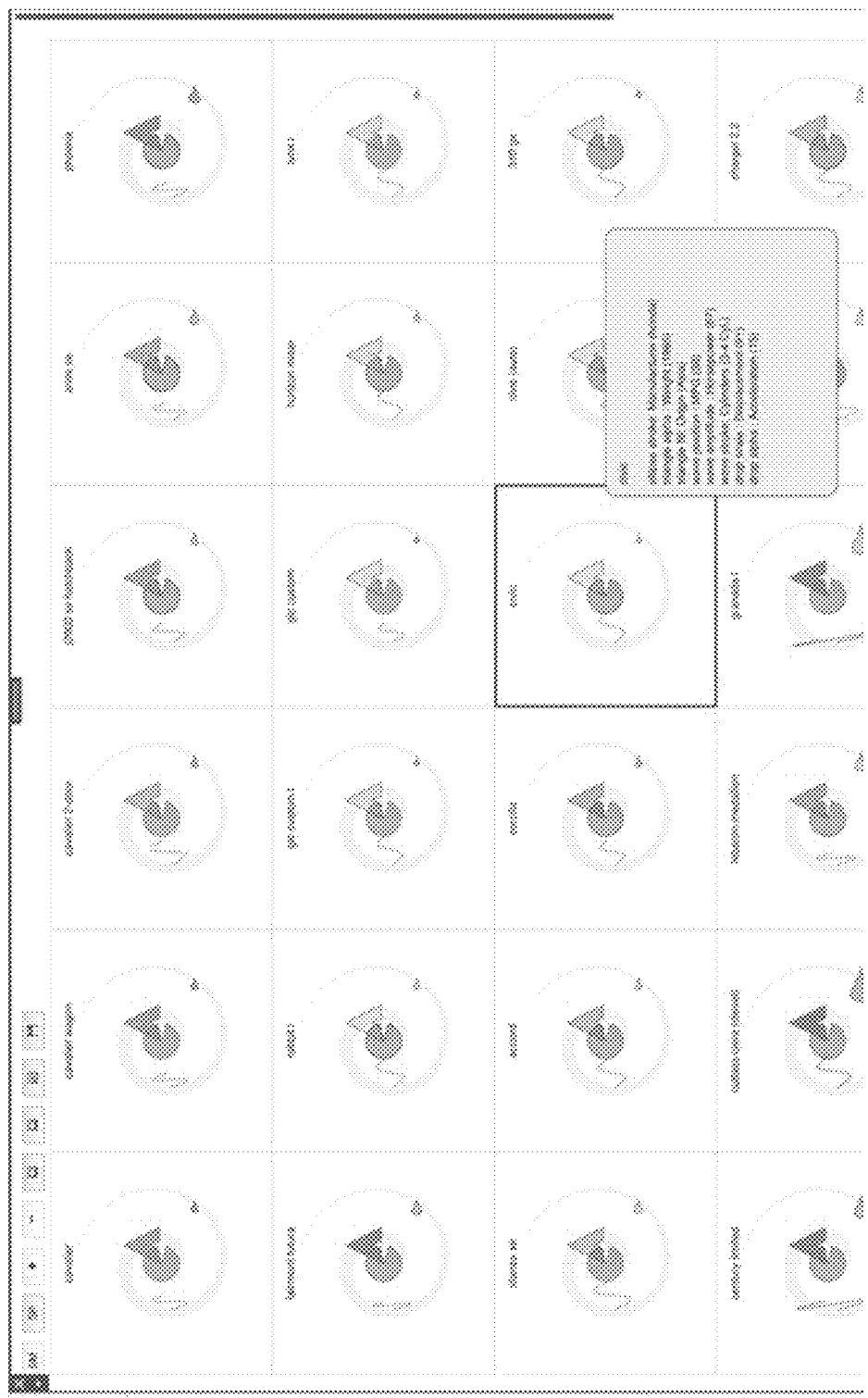
Figure 10C:
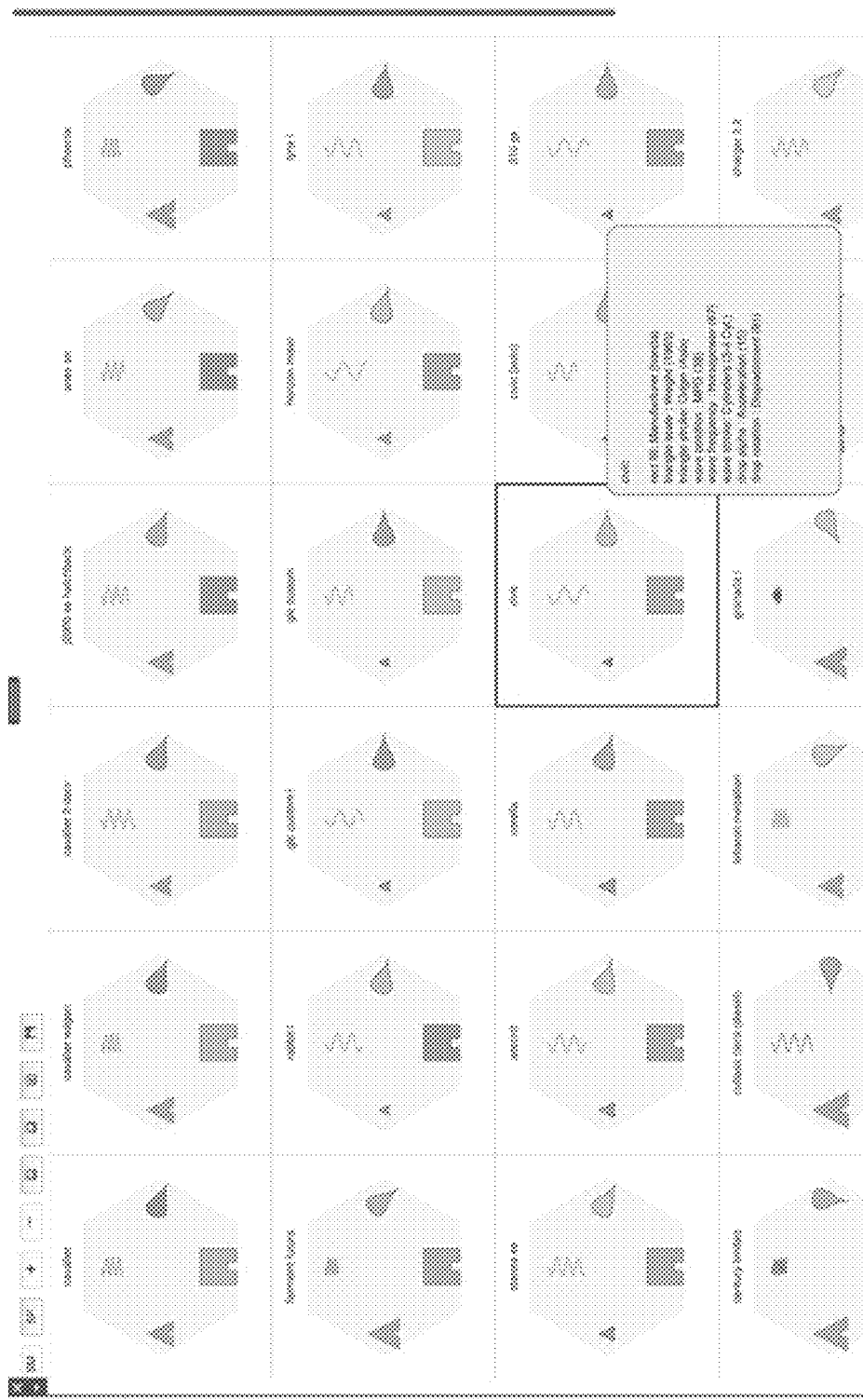

FIGS. 10A-10C illustrate additional examples of sets of glyphs generated from another data set (e.g., distinct from the data set described with reference to FIGS. 1 and 3-10).

For example, FIGS. 10A, 10B and 10C illustrates three examples of a small multiples mode in which a single glyph design is applied to all rows of data in a data set about cars.

Figure 11A:
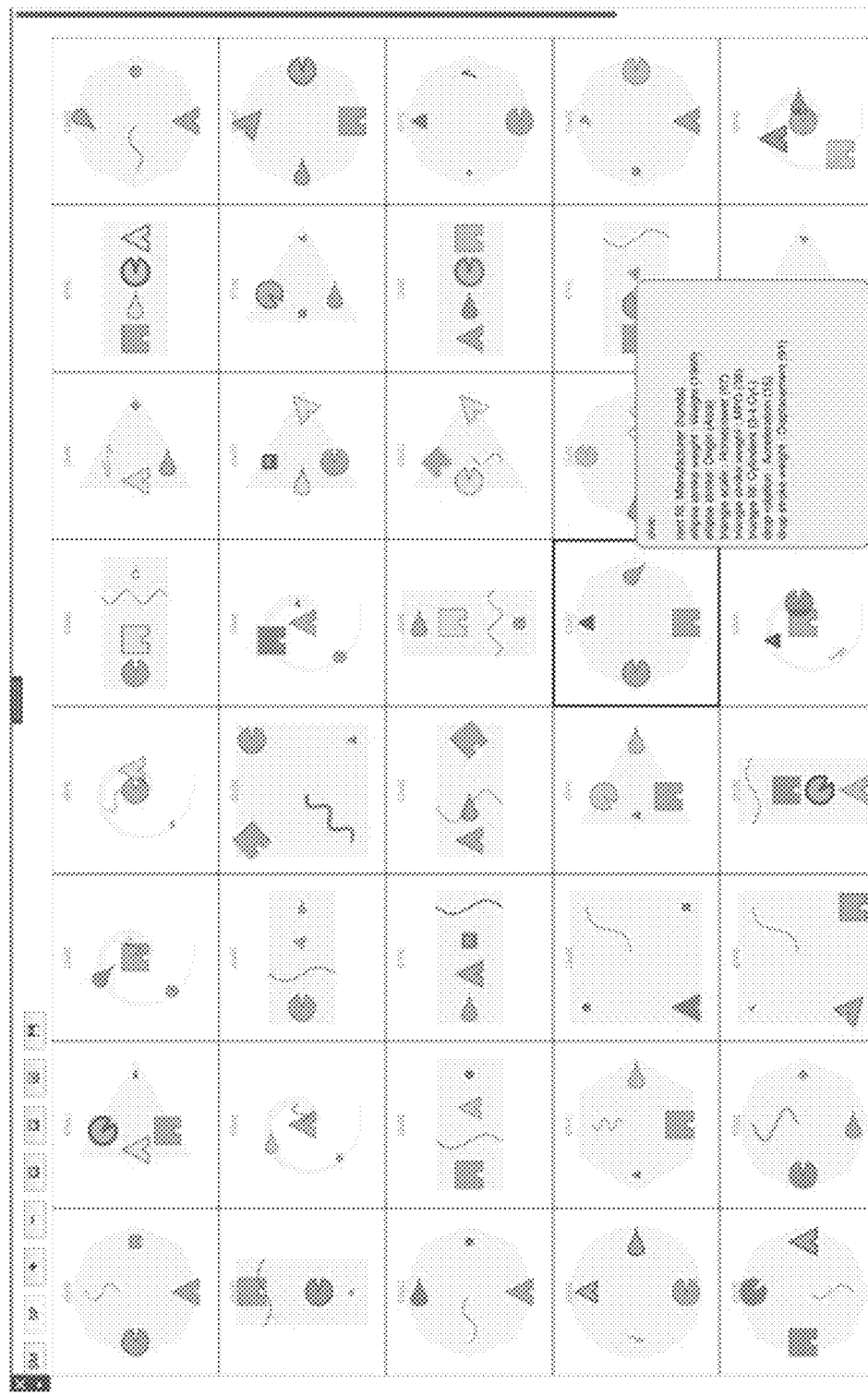
FIGS. 11A-11C illustrate glyph designs for a respective row of data in the data set.
Figure 11B:
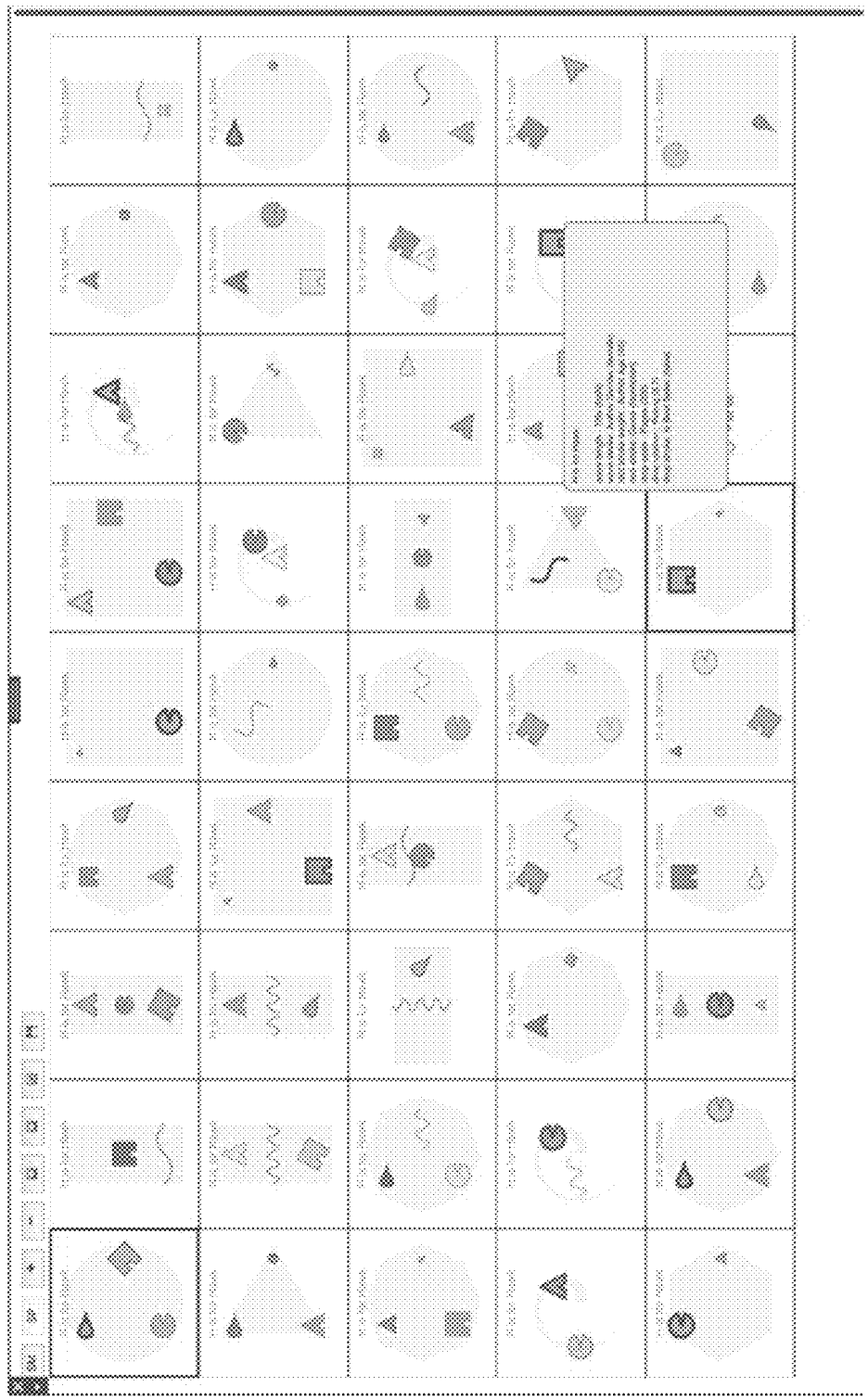
Figure 11C:
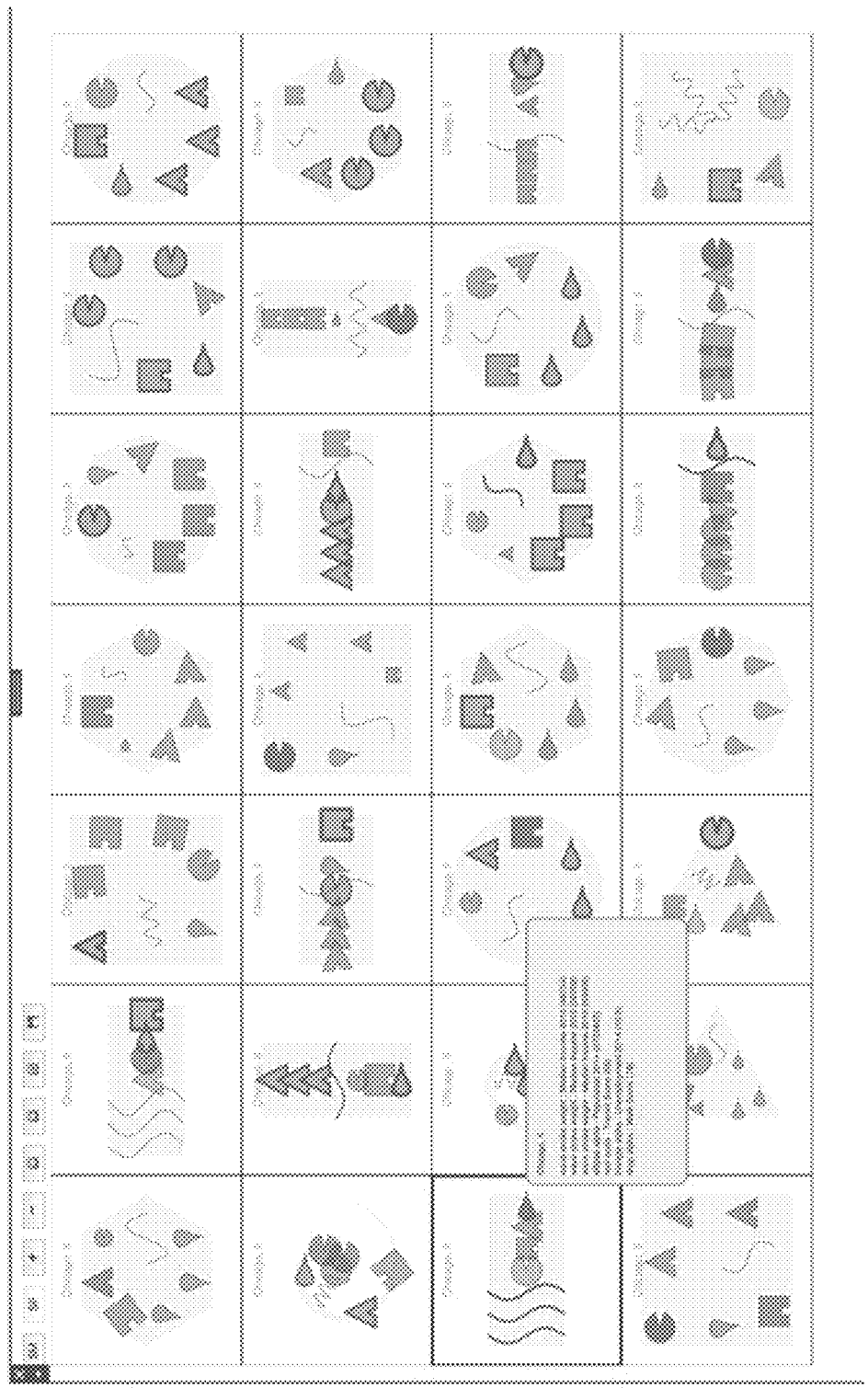

FIGS. 11A-11C illustrate additional examples of sets of glyphs generated from the other data sets. For example, FIG. 11A illustrates a small permutables mode where a variety of glyph designs are generated for a single row from the data set about cars (e.g., each glyph in FIG. 11A represents data for "civic"). FIG. 11B also illustrates a small permutables mode where a variety of glyph designs are generated to represent a single row (e.g., H is for Hawk) from a data set about books. FIG. 11C also illustrates a small permutables mode for where a variety of glyph designs are generated to represent a single row (e.g., Chicago from a data set about cities (e.g., the data set described with reference to FIGS. 1 and 3-9)).

Figure 12A:
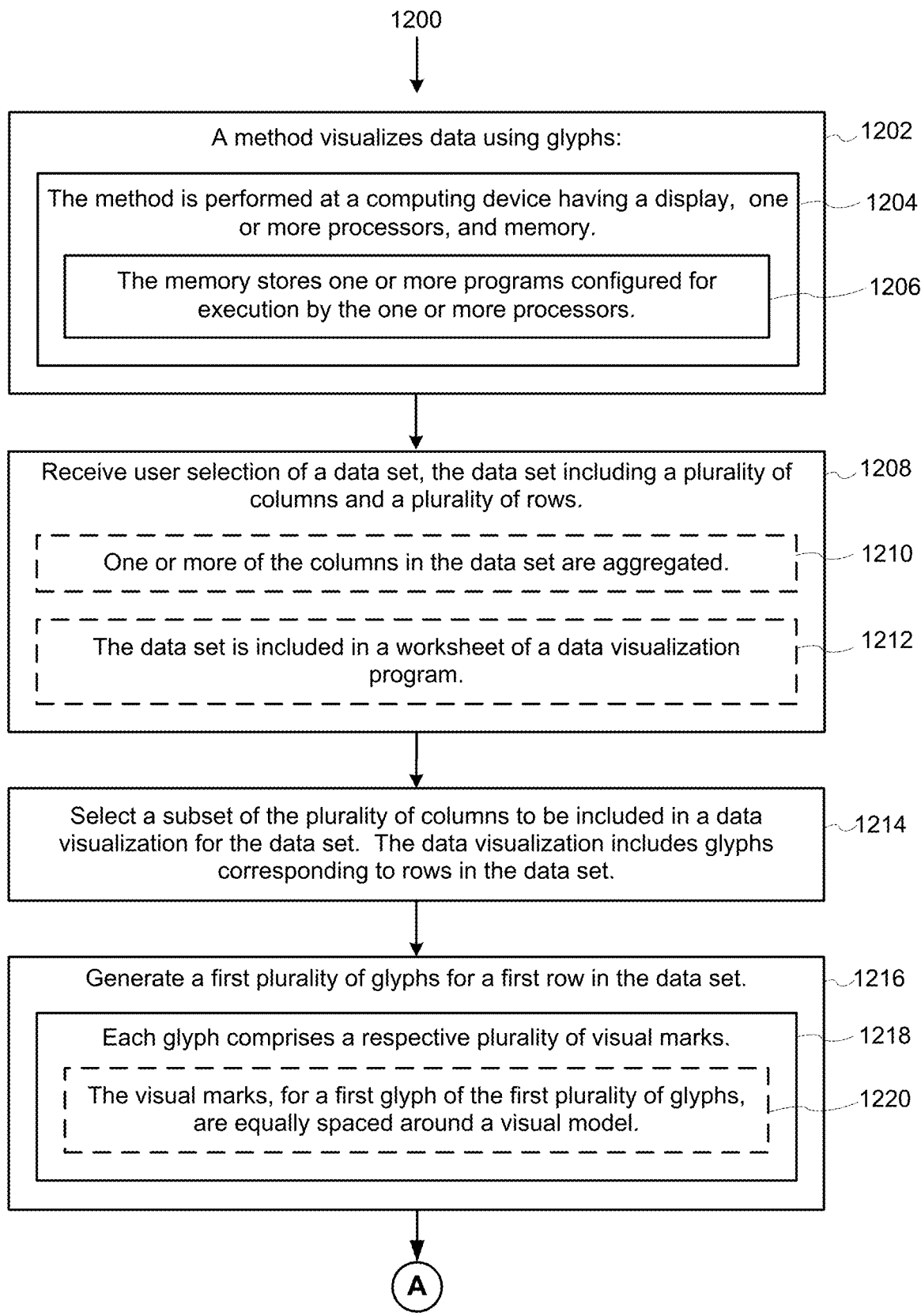
FIGS. 12A-12C provide a flowchart of a method for generating sets of glyphs in accordance with some implementations.
Figure 12B:
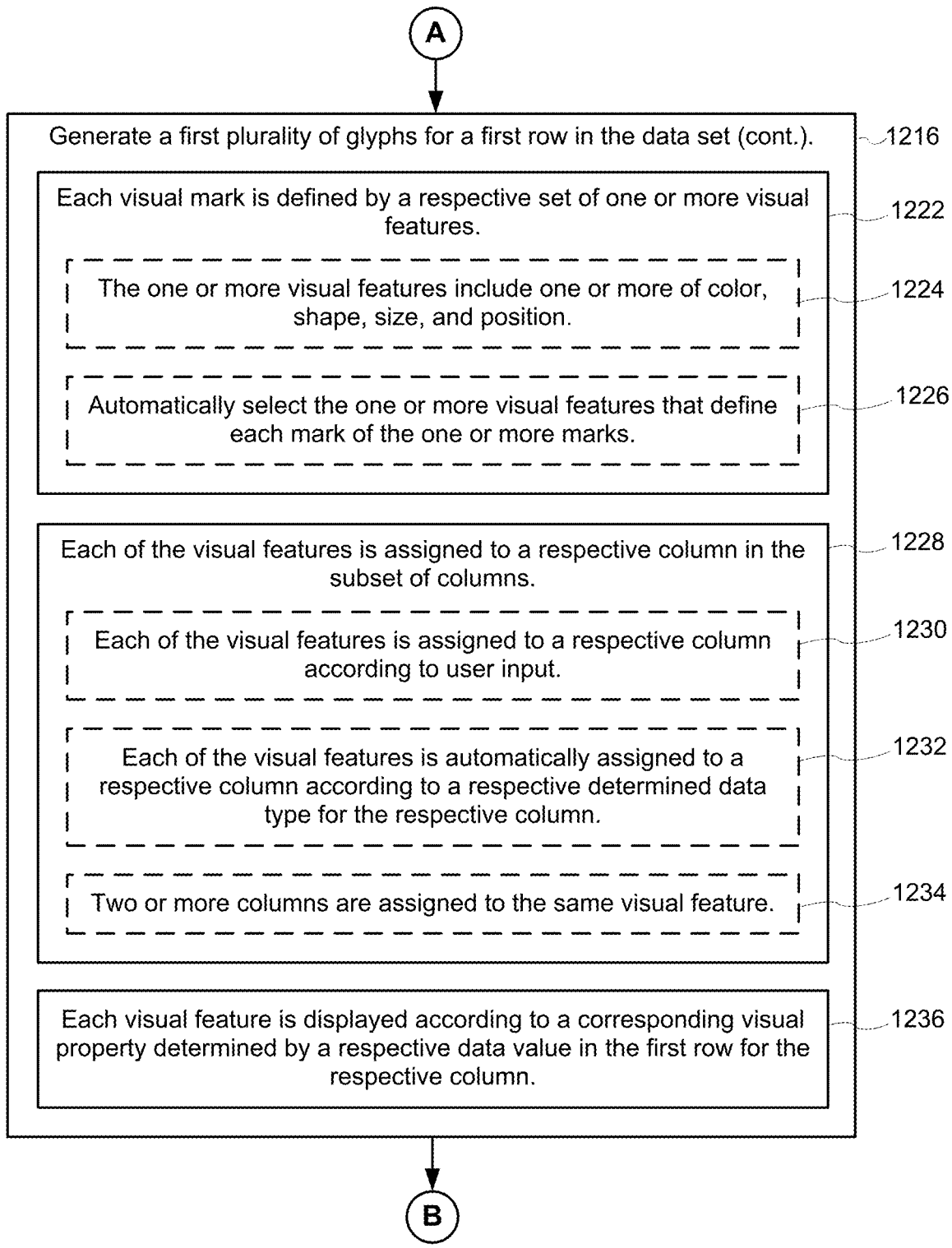
Figure 12C:
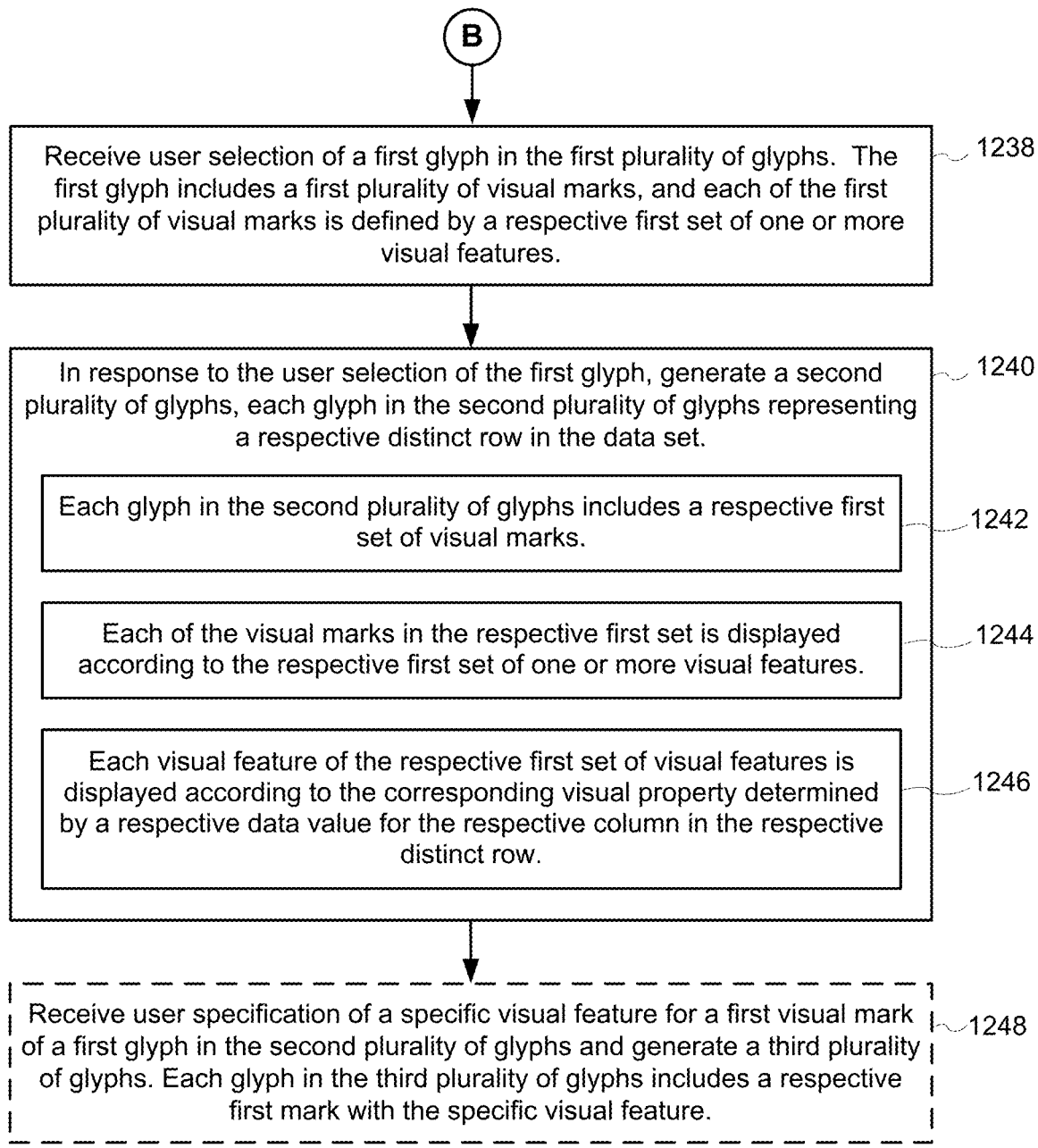

FIGS. 12A-12C provide a flowchart of a method 1200 for visualizing data (1202) in accordance with some implementations. The method 1200 is also called a process.

The method 1200 is performed (1204) at a computing device 200 that has a display 212, one or more processors 202, and memory 206. The memory 206 stores (1206) one or more programs configured for execution by the one or more processors 202. In some implementations, the operations performed by the computing device correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method may be combined and/or the order of some operations may be changed.

The method includes receiving (1208) user selection of a data set, the data set including a plurality of columns and a plurality of rows.

In some implementations, the data set includes (1210) one or more aggregated fields. For example, the aggregation occurs before selecting the subset of columns to be used in generating the glyph. For example, the measure values 112 shown in FIG. 1 illustrate aggregation (e.g., SUM) of particular columns.

In some implementations, the data set is included (1212) in a worksheet of a data visualization program. For example, the data set used to generate the glyphs in FIGS. 4-9 is defined in the worksheet of the data visualization program shown in FIG. 1.

The method includes selecting (1214) a subset of the plurality of columns to be included in a data visualization for the data set. The data visualization includes (1214) glyphs corresponding to rows in the data set. For example, the first set of glyphs will be different designs for the same row of data (e.g., the small permutables grid mode), so each column is assigned a different visual feature for each glyph. For example, the set of glyphs 502 illustrated in FIG. 5A is an example of a small permutables grid mode in which each of the glyphs in the set of glyphs 502 show a different glyph design for the same row of data (e.g., San Antonio, Tex.).

The method includes generating (1216) a first set of glyphs for a first row of data (e.g., where the first set of glyphs include glyphs with different designs for the same row of data, such that each column is assigned to a different visual property for each glyph). Each glyph in the first set of glyphs represents the same set of columns in a first row of the plurality of rows in the data set. For each glyph in the first set of glyphs, the method includes, defining (1218) a set of marks to be displayed.

In some implementations, the one or more marks are (1220) equally spaced around a visual model (scaffold). In some implementations, the visual model is determined automatically (e.g., the scaffold arrangement is selected (randomly) without user input to generate different glyph designs). For example, the glyph specification array 520 illustrates that the scaffold design can be selected from "horizontal" or "square." The marks of the glyph are thus spaced (e.g., arranged) around this "scaffold" shape. It will be understood that other scaffold shapes (in addition or instead of "horizontal" or "square") can be used to generate glyphs.

Each mark is defined (1222) by one or more visual features. For example, multiple glyphs are generated for row 1, where each glyph has its own design (e.g., its own set of marks, visual features of the marks, and visual properties). For example, FIG. 5B illustrates the glyph specification array 520 for the selected glyph 504 in FIG. 5A. The glyph specification array 520 specifies the set of marks to be displayed to generate glyph 504. Each glyph in the first set of glyphs 502 represents the same set of columns for the row "San Antonio, Tex." as defined by tooltip 506.

In some implementations, the one or more visual features includes (1224) one or more of color, shape, size, and position. In some implementations, the system automatically selects (1226) the one or more visual features that define each mark.

The method includes, for each glyph in the first set of glyphs, assigning (1228) a respective visual feature of the one or more visual features to each column of the subset of columns.

In some implementations, assigning a respective visual feature of the one or more visual features to a respective column of the subset of columns comprises (1230) receiving user input assigning the respective visual feature to the respective column. For example, the user selects that a first column corresponds to the size of a first mark, a second column corresponds to color of the first mark, and so on. In some implementations, each of the visual features is automatically assigned (1232) to a respective column according to a respective determined data type for the respective column. The visual features can thus be assigned to columns automatically (without user input) or can be manually selected by the user. In some instances, two or more columns are assigned (1234) to the same visual feature.

Each visual feature is displayed (1236) with a visual property determined based on a data value in the data set for the respective column. For example, as described above, the tooltip 506 illustrates the visual feature that is assigned to each column (or columns). For example, "triangle size" is assigned to "Transit Score" in glyph cell 504.

As an example for the first glyph: a first set of marks is defined (e.g., to follow a particular scaffold or a number of marks), each column is assigned a visual feature pertaining to a mark in the first set of marks (e.g., column 1 defines "size" of mark 1; column 2 defines "color" of mark 1, column 3 defines "shape" of mark 2, and so on) and the visual feature has a visual property whose value is determined by the data value of the corresponding column (e.g., when the data value for column 1 has a smaller value, the size is smaller).

In some implementations, assigning a respective visual feature of the one or more visual features to a respective column of the subset of columns includes determining a data type for each column in the subset of columns and automatically assigning (without user input) a respective column with a respective visual feature based on the data type of the column. For example, a categorical column is associated with color as the visual feature (e.g., not size as the visual feature) whereas as numeric column that has data values that are quantities is associated with a visual feature such as size or position. In some implementations, undefined marks (marks that are not assigned by the user to a visual feature) are automatically populated (e.g., assigned) to a particular visual feature in accordance with the data type.

In some implementations, the method further includes automatically selecting the one or more visual features that define each mark of the one or more marks. For example, the "shape" and "options" in the glyph array illustrated in FIG. 5B are selected as random samplings from a palette that defines the possible shapes and options to generate the glyph. In some implementations, some visual features do not have visual properties that change according to a data field. For example, the one or more marks are defined by a shape that does not change (e.g., the mark is a triangle), and the one or more marks also include visual features that do change according to a data field. For example, the mark remains a triangle (e.g., visual mark=triangle) but the size of the triangle (e.g., visual feature=size) changes based on a data value (e.g., visual property=the displayed size according to the data value).

In some implementations, two or more columns are assigned to a same visual feature. For example, a plurality of columns are assigned to a same "set_id" as described with reference to FIG. 3A (e.g., the repeat flag is set to on for columns "HS Graduation 2014", "HS Graduation 2015," "HS Graduation 2016." In this case, the plurality of columns is assigned to a same visual feature for a same mark.

In some implementations, two or more columns are assigned to a same visual feature for a distinct mark in the set of marks. For example, column 1 is assigned to a size of a first mark (e.g., triangle size) and column 2 is assigned to a size of a second mark (e.g., rectangle size). Although both column 1 and column 2 are assigned to a same visual feature "size," the visual feature is for distinct marks (e.g., triangle vs rectangle).

The method includes receiving (1238) a user selection of a first glyph in the first set of glyphs. The first glyph is defined by a first set of marks having a first set of respective visual features that are assigned to the subset of respective columns.

The method further includes, in response to the user selection of the first glyph, generating (1240) a second plurality of glyphs, each glyph in the second plurality of glyphs representing a respective distinct row in the data set. Each glyph in the second set of glyphs represents a respective row of data values for the subset of columns. Each glyph in the second set of glyphs includes (1242) the first set of marks and each visual mark is displayed (1244) according to the respective first set of one or more visual features.

Each visual feature of the respective first set of visual features is displayed (1246) according to the corresponding visual property determined by a respective data value for the respective column in the respective distinct row.

In some implementations, the second set of glyphs is the mode for viewing multiple rows of data, but each glyph has the same "design" (e.g., is defined by a same set of marks having visual features that are defined by visual properties, and each visual property is manipulated based on the value of the data field (for the respective row and column)).

For example, FIG. 6A illustrates a second set of glyphs 602 that is generated based on the glyph cell 504 that is selected by the user in FIG. 5A. The second set of glyphs 602 comprises a small multiples grid mode, such that the same glyph design (E.g., columns are assigned to respective visual features) is used for a plurality of different row values (e.g., San Antonio, Tex., Boston, Mass., Chicago, Ill., etc.).

As illustrated between FIG. 4 to FIG. 5A to FIG. 6A, a user may switch between views of the first set of glyphs to the second set of glyphs. For example, although the example method 1200 describes generating a first set of glyphs (e.g., in small permutables grid mode) and then generating a second set of glyphs (e.g., in small multiples grid mode) from the first set of glyphs, in some implementations, the small multiples grid mode is generated first, and the small permutables grid mode is generated based on a selection of a glyph cell in the small multiples grid mode. Thus, the first set of glyphs may be generated from the second set of glyphs, and vice versa. A user may switch between different modes by selecting different glyph cells to generate additional sets of glyphs. For example, FIG. 6B to 7A illustrates viewing a small multiples grid mode 602 to a small permutables grid mode 702, whereas FIG. 5A to FIG. 6A illustrates viewing a small permutables grid mode 502 to viewing a small multiples grid mode 602.

In some implementations, the method further includes receiving (1248) user selection indicating a visual feature in the first set of marks in the first glyph and generating a third set of glyphs. Each glyph in the third set of glyphs includes the indicated visual property. For example, a user can select (e.g., indicate) certain aspects of a glyph to be included in the design such that generating a set of glyphs is an iterative process whereby the user selects portions (e.g., one or more marks having one or more visual properties) of the first glyph (that the user likes) to be included in the next set of glyphs, or the user indicates particular visual features to enable variations of that type of visual property. This allows an iterative design process whereby a user can view selected visual features within different glyph designs (e.g., the system automatically changes other visual features but continues assigning the selected visual feature(s) to the corresponding column(s)). Instead of randomly generating new glyph designs, the user may indicate particular visual features or portions of a glyph to include in future generated glyph.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for visualizing data, comprising:
at a computing device having a display, one or more processors, and memory storing one or more programs configured for execution by the one or more processors:
receiving user selection of a data set, the data set including a plurality of columns and a plurality of rows;
selecting a subset of the plurality of columns to be included in a data visualization for the data set, the data visualization including glyphs corresponding to rows in the data set;
generating a first plurality of glyphs for a first row in the data set, wherein:
(i) each glyph comprises a respective plurality of visual marks;
(ii) each visual mark is defined by a respective set of one or more visual features;
(iii) each of the visual features is assigned to a respective column in the subset of columns; and
(iv) each visual feature is displayed according to a corresponding visual property determined by a respective data value in the first row for the respective column;
receiving user selection of a first glyph in the first plurality of glyphs, wherein the first glyph comprises a first plurality of visual marks, and each of the first plurality of visual marks is defined by a respective first set of one or more visual features; and
in response to the user selection of the first glyph, generating a second plurality of glyphs, each glyph in the second plurality of glyphs representing a respective distinct row in the data set, wherein:
(i) each glyph in the second plurality of glyphs comprises a respective first set of visual marks;
(ii) each of the visual marks in the respective first set is displayed according to the respective first set of one or more visual features; and
(iii) each visual feature of the respective first set of visual features is displayed according to the corresponding visual property determined by a respective data value for the respective column in the respective distinct row.

2. The method of claim 1, wherein one or more of the columns in the data set are aggregated.

3. The method of claim 1, wherein the one or more visual features include one or more visual features selected from the group consisting of color, shape, size, and position.

4. The method of claim 1, wherein each of the visual features is assigned to a respective column according to user input.

5. The method of claim 1, wherein each of the visual features is automatically assigned to a respective column according to a respective determined data type for the respective column.

6. The method of claim 1, wherein generating the first plurality of glyphs comprises automatically selecting the one or more visual features that define each mark of the one or more marks.

7. The method of claim 1, wherein two or more columns are assigned to a same visual feature.

8. The method of claim 1, wherein the visual marks, for a first glyph of the first plurality of glyphs, are equally spaced around a visual model.

9. The method of claim 1, further comprising:
receiving user specification of a specific visual feature for a first visual mark of a first glyph in the second plurality of glyphs; and
generating a third plurality of glyphs, wherein each glyph in the third plurality of glyphs includes a respective first mark with the specific visual feature.

10. The method of claim 1, wherein the data set is included in a worksheet of a data visualization program.

11. A computing device, comprising:
one or more processors; and
memory coupled to the one or more processors, the memory storing one or more programs configured for execution by the one or more processors, the one or more programs including instructions for:
receiving user selection of a data set, the data set including a plurality of columns and a plurality of rows;
selecting a subset of the plurality of columns to be included in a data visualization for the data set, the data visualization including glyphs corresponding to rows in the data set;
generating a first plurality of glyphs for a first row in the data set, wherein:
(i) each glyph comprises a respective plurality of visual marks;
(ii) each visual mark is defined by a respective set of one or more visual features;
(iii) each of the visual features is assigned to a respective column in the subset of columns; and
(iv) each visual feature is displayed according to a corresponding visual property determined by a respective data value in the first row for the respective column;
receiving user selection of a first glyph in the first plurality of glyphs, wherein the first glyph comprises a first plurality of visual marks, and each of the first plurality of visual marks is defined by a respective first set of one or more visual features; and
in response to the user selection of the first glyph, generating a second plurality of glyphs, each glyph in the second plurality of glyphs representing a respective distinct row in the data set, wherein:
(i) each glyph in the second plurality of glyphs comprises a respective first set of visual marks;
(ii) each of the visual marks in the respective first set is displayed according to the respective first set of one or more visual features; and
(iii) each visual feature of the respective first set of visual features is displayed according to the corresponding visual property determined by a respective data value for the respective column in the respective distinct row.

12. The computing device of claim 11, wherein one or more of the columns in the data set are aggregated.

13. The computing device of claim 11, wherein the one or more visual features include one or more visual features selected from the group consisting of color, shape, size, and position.

14. The computing device of claim 11, wherein each of the visual features is assigned to a respective column according to user input.

15. The computing device of claim 11, wherein each of the visual features is automatically assigned to a respective column according to a respective determined data type for the respective column.

16. The computing device of claim 11, wherein generating the first plurality of glyphs comprises automatically selecting the one or more visual features that define each mark of the one or more marks.

17. The computing device of claim 11, wherein two or more columns are assigned to a same visual feature.

18. The computing device of claim 11, wherein the visual marks, for a first glyph of the first plurality of glyphs, are equally spaced around a visual model.

19. The computing device of claim 11, wherein the one or more programs further comprise instructions for:
   receiving user specification of a specific visual feature for a first visual mark of a first glyph in the second plurality of glyphs; and
   generating a third plurality of glyphs, wherein each glyph in the third plurality of glyphs includes a respective first mark with the specific visual feature.

20. A non-transitory computer readable storage medium storing one or more programs configured for execution by a computer system having one or more processors and memory, the one or more programs comprising instructions for:
   receiving user selection of a data set, the data set including a plurality of columns and a plurality of rows;
      selecting a subset of the plurality of columns to be included in a data visualization for the data set, the data visualization including glyphs corresponding to rows in the data set;
      generating a first plurality of glyphs for a first row in the data set, wherein:
         (i) each glyph comprises a respective plurality of visual marks;
         (ii) each visual mark is defined by a respective set of one or more visual features;
         (iii) each of the visual features is assigned to a respective column in the subset of columns; and
         (iv) each visual feature is displayed according to a corresponding visual property determined by a respective data value in the first row for the respective column;
   receiving user selection of a first glyph in the first plurality of glyphs, wherein the first glyph comprises a first plurality of visual marks, and each of the first plurality of visual marks is defined by a respective first set of one or more visual features; and
   in response to the user selection of the first glyph, generating a second plurality of glyphs, each glyph in the second plurality of glyphs representing a respective distinct row in the data set, wherein:
      (i) each glyph in the second plurality of glyphs comprises a respective first set of visual marks;
      (ii) each of the visual marks in the respective first set is displayed according to the respective first set of one or more visual features; and
      (iii) each visual feature of the respective first set of visual features is displayed according to the corresponding visual property determined by a respective data value for the respective column in the respective distinct row.

* * * * *